US011937227B2

(12) United States Patent
Wang et al.

(10) Patent No.: US 11,937,227 B2
(45) Date of Patent: Mar. 19, 2024

(54) SUSPENSION OF PRE-SCHEDULED TRANSMISSION

(71) Applicant: QUALCOMM Incorporated, San Diego, CA (US)

(72) Inventors: Hua Wang, Basking Ridge, NJ (US); Junyi Li, Franklin Park, NJ (US); Piyush Gupta, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 249 days.

(21) Appl. No.: 17/195,204

(22) Filed: Mar. 8, 2021

(65) Prior Publication Data

US 2021/0314967 A1    Oct. 7, 2021

Related U.S. Application Data

(60) Provisional application No. 63/005,000, filed on Apr. 3, 2020.

(51) Int. Cl.
*H04W 72/12* (2023.01)
*H04W 72/0453* (2023.01)
*H04W 72/20* (2023.01)

(52) U.S. Cl.
CPC ....... *H04W 72/12* (2013.01); *H04W 72/0453* (2013.01); *H04W 72/20* (2023.01)

(58) Field of Classification Search
CPC .......................... H04W 72/12; H04W 72/0453
USPC ........................................................ 370/329
See application file for complete search history.

(56) References Cited

U.S. PATENT DOCUMENTS

| 2013/0022010 A1* | 1/2013 | Qianxi | H04L 5/0033 370/329 |
| 2016/0192420 A1* | 6/2016 | Kim | H04W 4/06 370/329 |

* cited by examiner

*Primary Examiner* — Angel T Brockman
(74) *Attorney, Agent, or Firm* — Holland & Hart LLP

(57) ABSTRACT

Methods, systems, and devices for wireless communications are described. In some examples, a user equipment (UE) may receive, from a base station, a configuration indicating a set of occasions configured for sidelink communications for the UE. The sidelink communications may include at least one of sidelink traffic, semi-persistent scheduling traffic, or a combination thereof. The UE may receive a control indication associated with a radio network temporary identifier. The control indication may include a downlink control information. In some examples, the UE may skip a first pre-scheduled occasion of the set of occasions configured for sidelink communications based on the control indication, and may perform sidelink communications during a second pre-scheduled occasion of the set of occasions after skipping the first pre-scheduled occasion.

32 Claims, 15 Drawing Sheets

SUSPENSION OF PRE-SCHEDULED TRANSMISSION

CROSS REFERENCE

The present Application for Patent claims the benefit of U.S. Provisional Patent Application No. 63/005,000 by WANG et al., entitled "SUSPENSION OF PRE-SCHEDULED TRANSMISSION," filed Apr. 3, 2020, assigned to the assignee hereof, and expressly incorporated by reference herein.

FIELD OF TECHNOLOGY

The following relates generally to wireless communications and more specifically to suspension of pre-scheduled transmission.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communication systems may support sidelink communications. Sidelink communications may support communications within a group of UEs. For example, sidelink communications may include communications between a UE and other UEs within a coverage area including the group of UEs. Sidelink communications may be improved, so that UEs may communicate with high reliability.

SUMMARY

The described techniques relate to improved methods, systems, devices, and apparatuses that support suspension of pre-scheduled transmission. Generally, the described techniques provide for efficient latency reduction techniques and reliable communications. The described techniques may enable a communication device, which may be a user equipment (UE) in a wireless communications system (e.g., a vehicle-to-everything (V2X) system, a vehicle-to-vehicle (V2V) network, a cellular V2X (C-V2X) network, a device-to-device (D2D) system, and the like) to suspend a pre-scheduled occasion configured for sidelink communications. A base station may configure the UE with a set of occasions configured for sidelink communications for the UE. The base station may then determine that a first pre-scheduled occasion of the set of occasions (e.g., an upcoming pre-scheduled occasion for performing sidelink communications) is to be suspended. In such an example, the base station may transmit a control indication (such as a radio network temporary identifier) indicating to a UE that the first pre-scheduled transmission is suspended. The UE may receive the control indication associated with the radio network temporary identifier, and may skip the first pre-scheduled occasion of the set of occasions configured for sidelink communications. In some examples, the UE may then perform sidelink communications during a second pre-scheduled occasion of the set of occasions after skipping the first pre-scheduled occasion.

DETAILED DESCRIPTION

Figure 1:
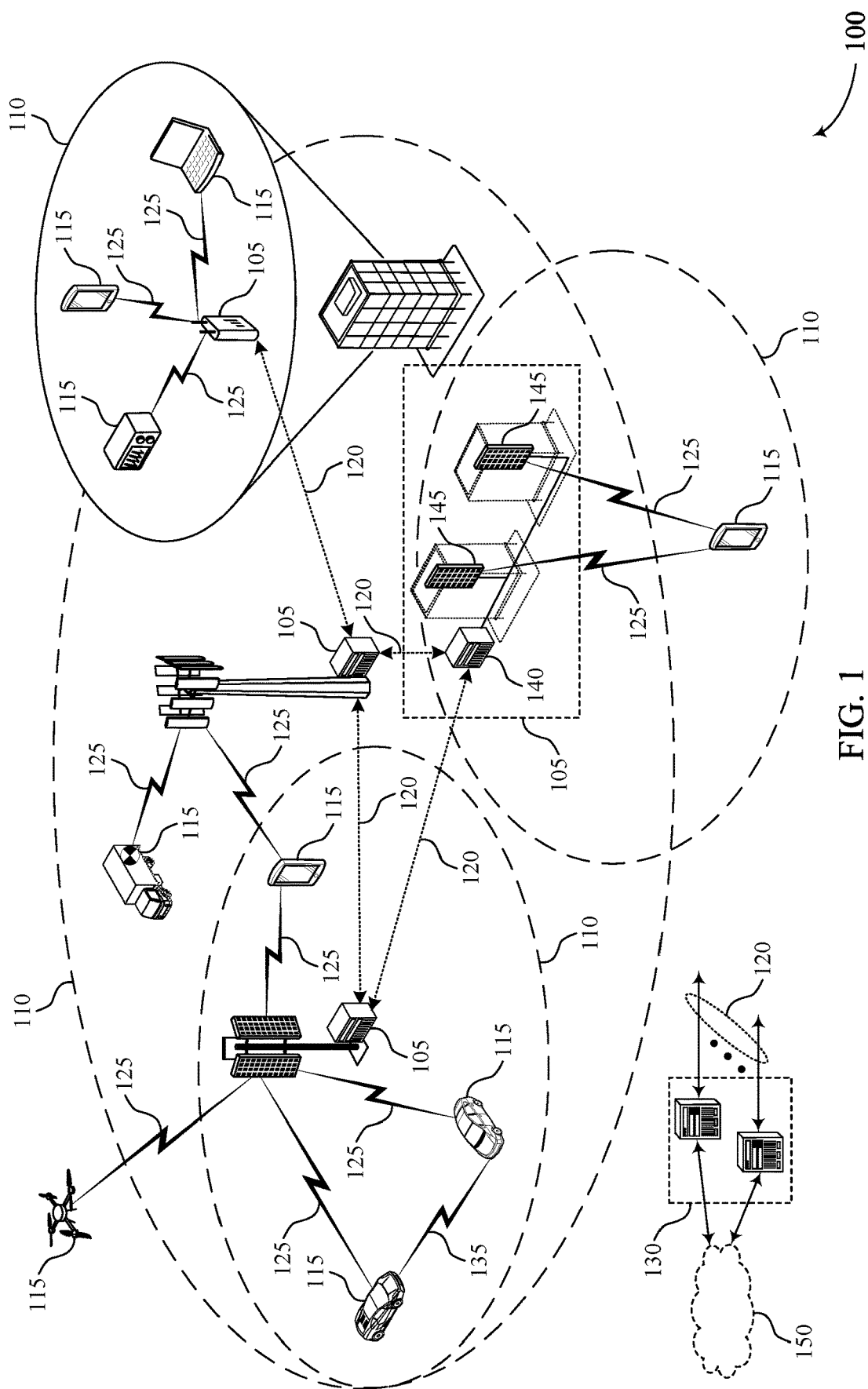
FIG. 1 illustrates an example of a wireless communications system that supports suspension of pre-scheduled transmission in accordance with aspects of the present disclosure.

A wireless communications system may support both access links and sidelinks for communications between one or more communication devices. An access link may refer to a communication link between a user equipment (UE) and a base station. For example, an access link may support uplink signaling, downlink signaling, connection procedures, etc. A sidelink may refer to any communication link between similar wireless devices (e.g., a communication link between UEs, or a backhaul communication link between base stations). It is noted that while various examples provided herein are discussed for UE sidelink devices, such sidelink techniques may be used for any type of wireless devices that use sidelink communications. For example, a sidelink may support one or more of device-to-device (D2D) communications, vehicle-to-everything (V2X) or vehicle-to-vehicle (V2V) communications, message relaying, discovery signaling, beacon signaling, or other signals transmitted over-the-air from one UE to one or more other UEs.

Sidelink communications may support communications within a group of UEs. For example, sidelink communications may include communications between a UE and other UEs within a coverage area including the group of UEs (e.g., a coverage area provided by a base station, a coverage area outside of the coverage area provided by the base station, or a combination thereof). One or more of the UEs in the group of UEs may initiate sidelink communications with other UEs in the group of UEs. For example, a UE may have information to transmit to the group of UEs (e.g., a detection of an object or obstacle on a road in a V2X system, scheduling information, among other examples) and the UE may initiate a sidelink communications including the information to the other UEs. The other UEs may monitor sidelink resource pools for the sidelink communications. In some examples, base stations may not be involved in sidelink communications because multiple UEs on the sidelink may receive a data transmission from a single UE, or a single UE may receive data transmissions from multiple UEs.

Certain sidelink communications may be pre-scheduled. A UE may be configured with pre-scheduled time and frequency resources to perform sidelink communications. In some examples, higher priority traffic may be scheduled during the same time period as a pre-scheduled sidelink communication. In such cases, the pre-scheduled traffic may cause an un-wanted interference to the delivery of the high priority traffic.

According to one or more aspects of the present disclosure, wireless communications systems supporting sidelink communications may support suspension of a pre-scheduled communication occasion at a UE. In one example, a base station may transmit a control indication (such as a radio network temporary identifier) indicating to a UE that an upcoming pre-scheduled transmission is suspended. In some examples, the UE may receive a configuration indicating a set of occasions configured for sidelink communications for the UE. The UE may then receive a control indication associated with a radio network temporary identifier. Upon receiving the control indication, the UE may be configured to skip a first pre-scheduled occasion of the set of occasions configured for sidelink communications. In some examples, the UE may resume the sidelink communications after skipping the first occasion.

UEs capable of sidelink communications may utilize the techniques described herein to experience power saving, such as reduced power consumption and extended battery life while ensuring reliable and efficient communications in the group of UEs. Particular aspects of the subject matter described in this disclosure may be implemented to realize one or more of the following potential advantages. The techniques employed by the described UEs may provide benefits and enhancements to the operation of the UEs. For example, operations performed by the UEs may provide improvements to wireless operations. In some examples, the UEs may support high reliability and low latency communications, among other examples, in accordance with aspects of the present disclosure. The described techniques may thus include features for improvements to power consumption, spectral efficiency, higher data rates and, in some examples, may promote enhanced efficiency for high reliability and low latency operations, among other benefits.

Aspects of the disclosure are initially described in the context of wireless communications systems. Aspects of the disclosure are further illustrated by and described with reference to additional wireless communications systems and process flow. Aspects of the disclosure are further illustrated by and described with reference to apparatus diagrams, system diagrams, and flowcharts that relate to suspension of pre-scheduled transmission.

FIG. 1 illustrates an example of a wireless communications system 100 that supports suspension of pre-scheduled transmission in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI)

may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using V2X communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Some wireless communications system may support both access links and sidelinks for communications between one or more communication devices. An access link may refer to a communication link between a UE and a base station. A sidelink may refer to any communication link between similar wireless devices (e.g., a communication link between UEs, or a backhaul communication link between base stations). In some examples, some sidelink communications may be pre-scheduled by a network entity (e.g., a base station). In some cases, the pre-scheduled communication resources may interfere with communication of high priority traffic. It may be desirable to suspend some pre-scheduled transmission, so that UEs and base stations can communicate with high reliability and low latency.

According to one or more aspects of the present disclosure, the wireless communications system 100 may be configured to support access links and sidelink communications. A base station 105 may determine to suspend a pre-scheduled transmission at a UE 115. In some examples, the base station 105 may transmit a configuration indicating a set of occasions configured for sidelink communications for the UE 115. For example, the base station 105 may configure a UE with time and frequency resources for performing sidelink communications. The UE 115 may then receive, from the base station 105, a control indication associated with a radio network temporary identifier, and may skip a first pre-scheduled occasion of the set of occasions configured for sidelink communications based on the control indication. In some examples, the UE 115 may perform sidelink communications during a second pre-scheduled occasion of the set of occasions after skipping the first pre-scheduled occasion.

Figure 2:
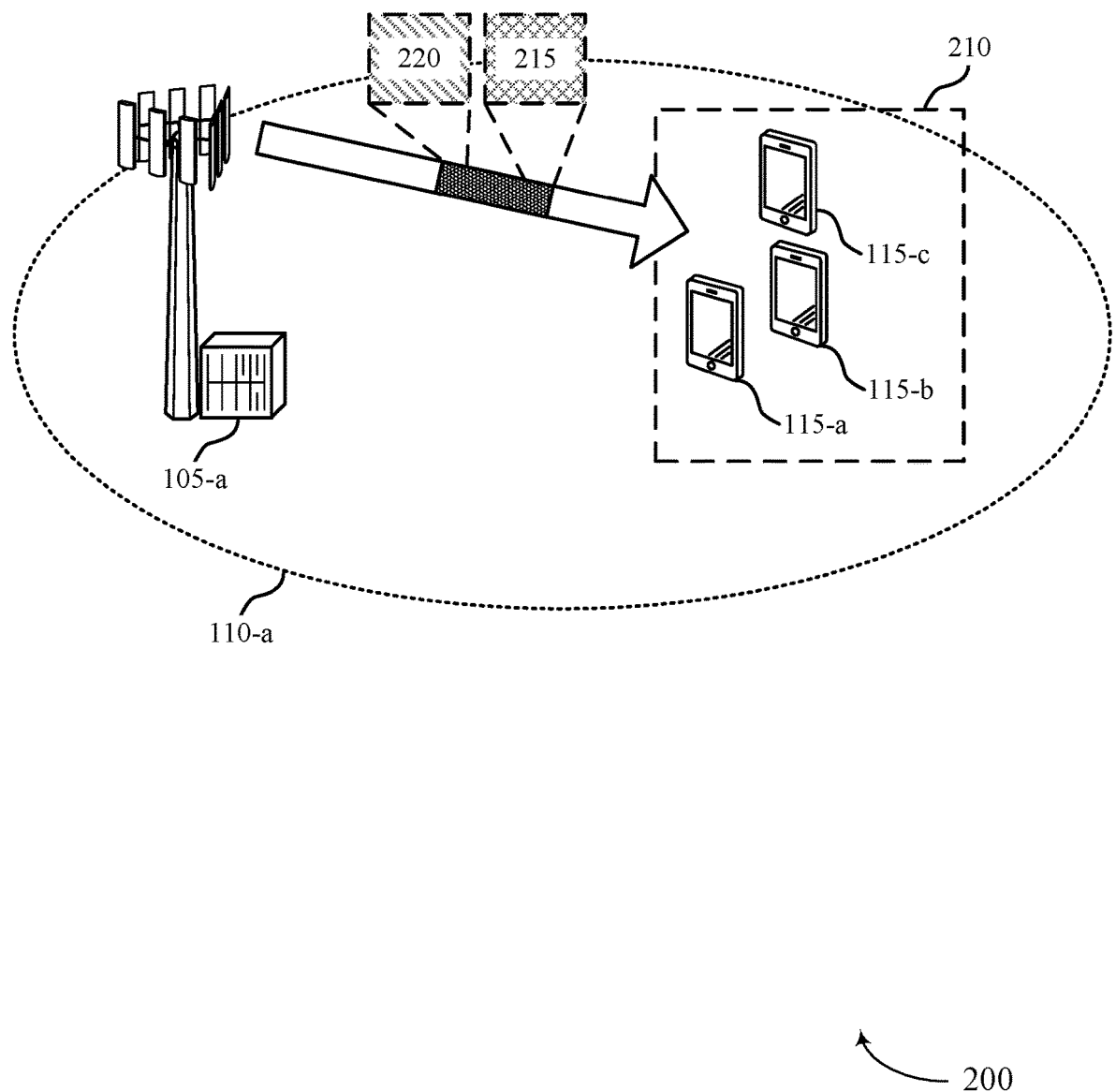
FIG. 2 illustrates an example of a wireless communications system that supports suspension of pre-scheduled transmission in accordance with aspects of the present disclosure.

FIG. 2 illustrates an example of a wireless communications system 200 that supports suspension of pre-scheduled transmission in accordance with aspects of the present disclosure. In some examples, the wireless communications system 200 may implement aspects of wireless communications system 100. The wireless communications system 200 includes base station 105-a, geographic coverage area 110-a, and one or more UEs 115. In some cases, the wireless communications system 200 may utilize semi-persistent occasion utilization to enhance scheduling and communications flexibility. In some examples, the group of UEs 115 (e.g., UE 115-a, UE 115-b, and UE 115-c) may communicate with each other (e.g., within a V2X system, a D2D system, and the like) and may employ sidelink transmissions to save power, reduce latency, and ensure reliable communications. In some examples, vehicles may communicate using V2X transmission mode 3 (that utilizes network scheduling).

The wireless communications system 200 may support both access links and sidelinks for communications between one or more communication devices. An access link may refer to a communication link between a UE 115 (such as, UE 115-a and UE 115-b) and a base station 105-a. A sidelink may refer to any communication link between similar wireless devices (e.g., a communication link between UEs, or a backhaul communication link between base stations). It is noted that while various examples provided herein are discussed for UE sidelink devices, such sidelink techniques may be used for any type of wireless devices that use sidelink communications. For example, a sidelink may support one or more of D2D communications, V2X or V2V communications, message relaying, discovery signaling, beacon signaling, or other signals transmitted over-the-air from one UE to one or more other UEs.

Base station 105-a may communicate with one or more UEs 115 (e.g., UEs 115-a, 115-b, and 115-c), which may be included within a UE group 210. For example, base station 105-a may transmit control information to UE 115-a, UE 115-b, or UE 115-c. As depicted in the example of FIG. 2, the UE 115-a, the UE 115-b, and the UE 115-c may communicate with each other (or with another group of UEs 115) over sidelink communications (e.g., using a peer-to-peer (P2P) or D2D protocol). In some cases, the UE 115-a may transmit sidelink transmissions to the UE 115-b or the UE 115-c. In some examples, UE 115-a or UE 115-b may monitor resource pools for the sidelink communications or indications of the sidelink communications (e.g., resource reservations, control channel transmissions, among other examples) from other UEs 115 in the group. Additionally or alternatively, the UEs 115 may have data to transmit to (or receive from) one or more of the UEs 115 in the group and may use the sidelink communications to transmit the data transmission. In some examples, the group of UEs 115 may utilize sidelinks communications in addition to access links with the base station 105-a.

In some examples, sidelink communications may support communications within a group of UEs 115 (e.g., group 210). For instance, sidelink communications may include communications between a UE (such as, UE 115-a, UE 115-b, and UE 115-c) and other UEs 115 within a coverage area including the group of UEs (e.g., a coverage area provided by a base station, a coverage area outside of the coverage area provided by the base station, or a combination thereof). One or more of the UEs 115 in the group of UEs 115 may initiate sidelink communications with other UEs in the group of UEs. For example, one or more of the UEs 115 may be in a coverage area 110-a (e.g., a coverage area 110 with reference to FIG. 1) of the base station 105-a. In such examples, a UE 115 may communicate with the base station 105-a via a Uu interface (e.g., the base station 105-a may transmit downlink communications to one or more of the UEs 115 via an access link). In some other examples, the group of UEs 115 may not be inside the coverage area or may not communicate with the base station 105-a using an access link.

In some cases, a UE 115 (such as, UE 115-a, UE 115-b, and UE 115-c) may have information (e.g., a detection of an object or obstacle on a road in a V2X system, scheduling information, among other examples) to transmit to the group of UEs 115, and the UE 115 may initiate sidelink communications including the information to the other UEs 115. In such cases, the UE 115 initiating the sidelink communications may be referred to as a transmitting UE and the UE 115 receiving the sidelink communications may be referred to as a receiving UE.

In some examples, the base station 105-a may configure sidelink communication resources for the group of UEs using a configuration message (e.g., semi-persistent scheduling configuration message). In some cases, the semi-persistent scheduling configuration message may be signaled to the one or more UEs 115 via radio resource control signaling and may include configuration information (e.g., a set of semi-persistent scheduling occasions configured for downlink communications). One or more UEs 115 may share the same semi-persistent scheduling configuration and may attempt to decode a downlink data transmission (e.g., physical downlink shared channel) at each configured semi-persistent scheduling occasion. In some cases, the configurations may be deactivated by a semi-persistent scheduling deactivation message.

In some wireless communications systems, some transmissions may be pre-scheduled (e.g., semi-persistent transmission, and cellular V2X (C-V2X) transmission mode 3 (e.g., network assisted resource scheduling)). A UE configured with pre-scheduled transmission may use pre-determined time-frequency resource. However, in some cases, the base station may configure high priority traffic. If high priority traffic (such as an ultra-reliable low-latency communication packet) arrives unexpectedly, then the transmission of the pre-scheduled traffic may cause an un-wanted interference to the delivery of the high priority traffic. In some examples, the high priority traffic may be delivered in an uninterrupted manner if the pre-scheduled transmission is suspended.

In some examples, the wireless communications system 200 may support C-V2X transmission mode 3. In C-V2X transmission mode 3, the base station 105-a may send a physical downlink control channel using a downlink control information format 5A to schedule a physical sidelink shared channel for C-V2X traffic. The control information may be specific for a single UE 115 or for a group of UEs (e.g., UE group 210). In some examples, the downlink control information format 5A may specify frequency resource allocation, and a time slot on which the physical sidelink shared channel is to be transmitted after receiving the downlink control information (i.e., the downlink control information having the format 5A). In some examples, the downlink control information may be conveyed by the base station 105-a in radio resource control messaging's resource pool information. Additionally or alternatively, the base station 105-a may be configured to indicate a re-transmission time of the C-V2X traffic using a "time gap between initial transmission and retransmission" field in downlink control information format 5A and sidelink control information format 1.

In some examples, a first UE 115-*a* may be scheduled to send sidelink traffic to a second UE 115-*b* during a time slot. At the time slot scheduled for the sidelink transmission, an ultra-reliable low-latency communication downlink traffic (or higher priority traffic) may be scheduled to be sent from the base station 105-*a* to a third UE 115-*c*. In such an example, the sidelink traffic between the first UE 115-*a* and the second UE 115-*b* may interfere with the ultra-reliable low-latency communication downlink traffic. To reduce the interference of the ultra-reliable low-latency communication downlink traffic, it may be desired to suspend the sidelink transmission between the first UE 115-*a* and the second UE 115-*b*.

In some cases, the semi-persistent scheduling may be used to reduce the control overhead of dynamic scheduling. In the downlink semi-persistent scheduling, a device (such as a UE) may be configured with a periodicity of the data transmissions using radio resource control signaling. In some examples, the semi-persistent scheduling may be activated using physical downlink control channel. The physical downlink control channel may also carry resource allocation information. In the uplink, there may be two types of semi-persistent scheduling. The first type of semi-persistent scheduling may be associated with a configured grant type 1, where the uplink grant is provided by radio resource control signaling, including activation of the grant. Additionally or alternatively, the second type of semi-persistent scheduling may be associated with a configured grant type 2, where the transmission periodicity is provided by radio resource control signaling, and L1/L2 control signaling is used to activate/deactivate the transmission in a manner similar to downlink. After enabling semi-persistent scheduling, the device may continue to monitor physical downlink control channel for dynamic uplink and downlink scheduling commands. Dynamic scheduling in the semi-persistent scheduling resource is of higher priority than the semi-persistent scheduling. This may be useful for UEs and base stations when there are occasional transmissions of large amounts of data for which semi-persistent scheduling allocation is not sufficient.

In dynamic time division duplex, one cell may be communication in a downlink frame and the neighboring cell may be communicating in an uplink frame. A first UE (e.g., UE 115-*a*) communicating using an uplink frame can be scheduled with semi-persistent scheduling configuration. In some examples, there may not be any traffic for a second UE (e.g., UE 115-*b*) associated with the base station 105-*a* in the uplink semi-persistent scheduling slot for the second UE (e.g., UE 115-*b*). However, if an unexpected one-time downlink traffic (such as ultra-reliable low-latency communication) arrives at the base station 105-*a* targeting at a third UE (e.g., UE 115-*c*) in a slot following the uplink semi-persistent scheduling slot for the second UE (e.g., UE 115-*b*), then the second UE's uplink semi-persistent scheduling may cause an interference to third UE's (e.g., UE 115-*c*) downlink traffic. In such an example, it may be desired to suspend the second UE's (e.g., UE 115-*b*) uplink semi-persistent scheduling transmission for one slot and resume the uplink semi-persistent scheduling after reception of the downlink traffic at the third UE (e.g., UE 115-*c*). Some wireless communications systems provide for deactivating the semi-persistent scheduling and then de-reactivating the semi-persistent scheduling. However, deactivating and reactivating the semi-persistent scheduling may involve two signaling and may thus be resource intensive.

According to one or more aspects of the present disclosure, a base station 105-*a* may be configured to suspend a pre-scheduled transmission at a UE (such as a UE 115 from the group of UEs). In some examples, the base station 105-*a* may transmit a radio network temporary identifier indicating to a specific UE that a pre-scheduled transmission is suspended. According to one or more aspects, a UE may receive, from a base station, a configuration 215 indicating a set of occasions configured for sidelink communications for the UE. For example, the base station 105-*a* may configure a UE with time and frequency resources for performing sidelink communications. The UE may then receive, from the base station, a control indication 220 associated with a radio network temporary identifier and may skip a first pre-scheduled occasion of the set of occasions configured for sidelink communications based on the control indication 220. That is, the base station 105-*a* may configure the UE to suspend the scheduled sidelink communications during a time period (such as time occasion or time slot) based on the control indication 220. The UE may then resume the sidelink communications after skipping the first occasion. For instance, the UE may perform sidelink communications during a second pre-scheduled occasion of the set of occasions after skipping the first pre-scheduled occasion.

According to one or more aspects, a UE (such as UE 115-*a*, UE 115-*b*, and UE 115-*c*) may receive a physical downlink control channel specified by a cell radio network temporary identifier and may determine to suspend a scheduled sidelink communications based on a downlink control information. In physical downlink control channel specified by the cell radio network temporary identifier, the base station 105-*a* may use frequency domain resource assignment bits in a downlink control information to indicate to a specific UE that a pre-scheduled transmission is suspended. In some cases, a UE may identify a number of frequency domain resource assignment bits included in the control indication 220, where the radio network temporary identifier includes a cell radio network temporary identifier. The UE may then determine to skip the first pre-scheduled occasion of the set of occasions based on identifying the number of frequency domain resource assignment bits.

According to one example, for downlink control information format 0_0, the base station 105-*a* may use resource allocation type 2 to encode an uplink semi-persistent scheduling starting resource block allocation and may set a length of the resource block to be zero. In this example, the resource allocation type 2 and the length of the resource block may indicate to the UE, the next sidelink transmission occasion is suspended. For example, the UE may identify a type associated with a resource allocation and a length of a resource block associated with the control indication 220, and may determine to skip the first pre-scheduled occasion of the set of occasions based on identifying the type associated with the resource allocation and the length of the resource block. As described herein, a format associated with the control indication 220 may be 0_0 and the length of the resource block may be zero.

According to another example, for a frequency resource allocation field of downlink control information format 5A, the base station 105-*a* may set the resource indication value to zero to indicate that the following sidelink transmission is suspended. Upon receiving the control indication 220, the UE may identify a resource allocation field value associated with the control indication 220, and determine to skip the first pre-scheduled occasion of the set of occasions based on identifying the resource allocation field value. As described herein, the UE may determine that a format associated with the control indication 220 is 5A and the resource allocation field value is zero.

In some examples, the base station 105-*a* may provide the UE 115 with a sidelink control information-suspension-radio network temporary identifier. In some cases, the sidelink control information-suspension-radio network temporary identifier may be associated with a downlink control information format such that one bit in the downlink control information may indicate to a UE that a following sidelink transmission is suspended. In one example, if the downlink control information format 5A is specified by the sidelink control information-suspension-radio network temporary identifier, then the frequency resource allocation field may have one bit, and the base station 105-*a* may utilize that bit to indicate to the UE that the following sidelink transmission is suspended. Additionally or alternatively, if the downlink control information format 0_0 is specified by the sidelink control information-suspension-radio network temporary identifier, then the frequency domain resource assignment bits may have one bit, and the base station 105-*a* may utilize that bit to indicate to the UE that the following uplink semi-persistent scheduling transmission is suspended.

According to one or more examples, upon receiving the control indication 220, the UE may identify a format associated with the control indication 220 and a bit included in the control indication 220. The UE may determine to skip the first pre-scheduled occasion of the set of occasions based on identifying the format associated with the control indication 220 and the bit included in the control indication 220. In some examples, the format associated with the control indication 220 is 5A and the radio network temporary identifier includes a sidelink control information suspension radio network temporary identifier. Additionally or alternatively, the format associated with the control indication 220 is 0_0 and the radio network temporary identifier includes a semi-persistent scheduling suspension radio network temporary identifier. In some examples, the base station 105-*a* may transmit the sidelink control information-suspension-radio network temporary identifier through radio resource control messaging.

According to one or more aspects of the present disclosure, the base station 105-*a* may use a common indication to suspend a group of UEs' (e.g., group 210) pre-scheduled transmission. In one example, a group of UEs can be provided with a group-suspension-radio network temporary identifier for a downlink control information format such that one bit in the downlink control information indicates to UEs in the group that the following pre-scheduled transmission is suspended. In one example, the bit in the downlink control information can be a frequency domain resource assignment bit in downlink control information format 0_0 or a frequency resource allocation field bit in downlink control information format 5A. In some cases, one or more UEs from the group of UEs may determine that the radio network temporary identifier is associated with a group of UEs. For instance, the one or more UEs may identify that the radio network temporary identifier includes a group suspension radio network temporary identifier. The one or more UEs may then identify a format associated with the control indication 220 and a frequency domain resource assignment bit associated with the control indication 220, and determine to skip the first pre-scheduled occasion of the set of occasions based on identifying the format associated with the control indication 220 and the frequency domain resource assignment bit. Additionally or alternatively, the one or more UEs may identify a format associated with the control indication 220 and a frequency resource allocation field bit associated with the control indication 220, and determine to skip the first pre-scheduled occasion of the set of occasions based on identifying the format associated with the control indication 220 and the frequency resource allocation field bit In some examples, the format associated with the control indication 220 may be 0_0 or 5A.

In some examples, the base station 105-*a* may transmit the group suspension radio network temporary identifier through radio resource control messaging. In one example, a UE may receive a radio resource control signal from the base station 105-*a*, and may identify the radio network temporary identifier included in the radio resource control signal. Additionally or alternatively, the base station 105-*a* may transmit a group-semi-persistent scheduling-suspension-radio network temporary identifier for suspension of upcoming uplink semi-persistent scheduling traffic. In some examples, the base station 105-*a* may transmit a group-sidelink control information-suspension-radio network temporary identifier for suspension of upcoming sidelink traffic.

Figure 3:
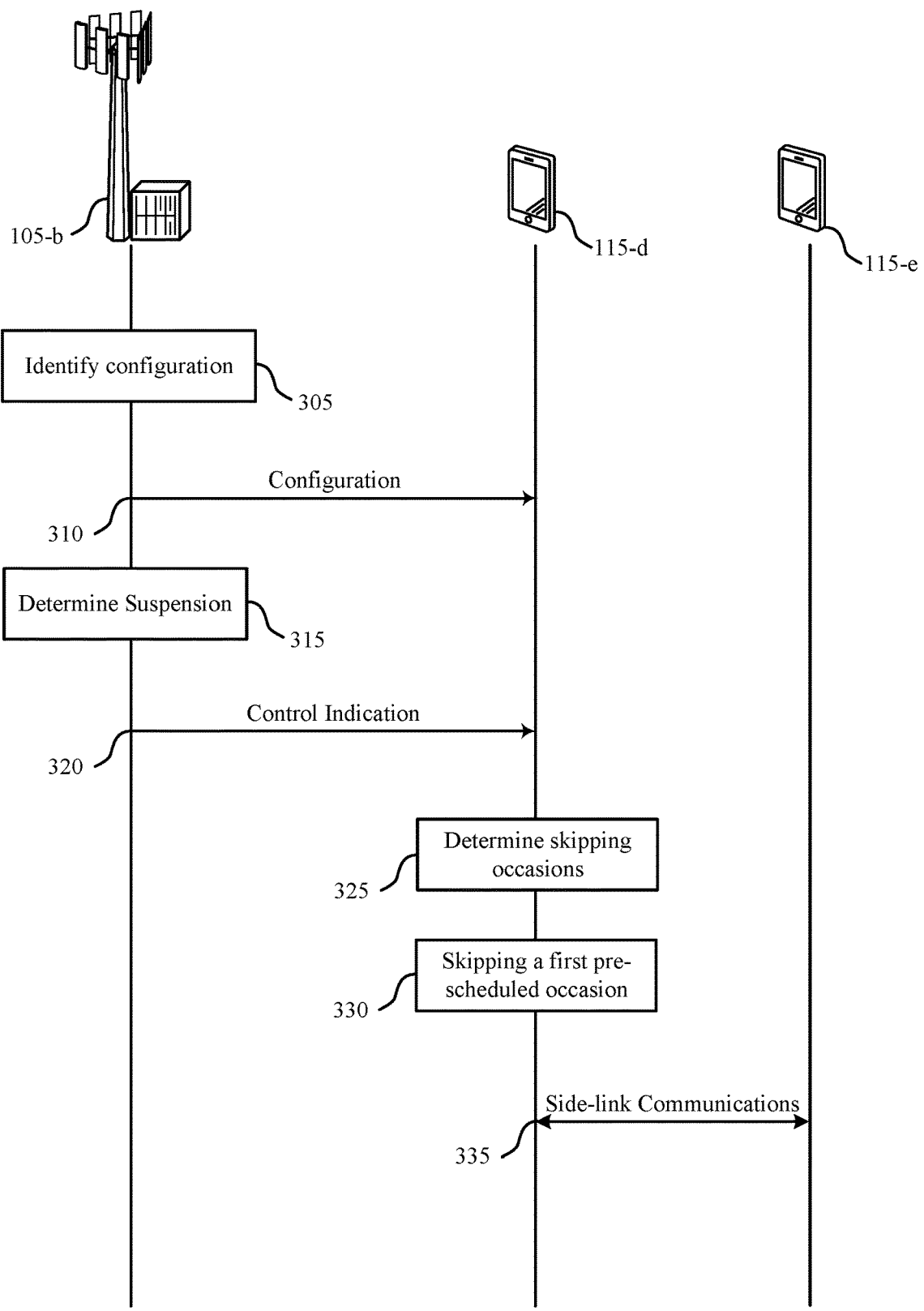
FIG. 3 illustrates an example of a process flow that supports suspension of pre-scheduled transmission in accordance with aspects of the present disclosure.

FIG. 3 illustrates an example of a process flow 300 that supports suspension of pre-scheduled transmission in accordance with aspects of the present disclosure. In some examples, the process flow 300 may implement aspects of the wireless communications system 100 and 200 described with reference to FIGS. 1 and 2, respectively. For example, the process flow 300 may be based on one or more rules for assigning channel state information processing units for channel state information reporting. The process flow 300 may be implemented by the UE 115-*d*, the UE 115-*e* and the base station 105-*b* for reduced power consumption, and may promote low latency and low interference for wireless communications supporting high priority channels, among other benefits. The base station 105-*b*, the UE 115-*d*, and the UE 115-*e* may be examples of a base station 105 and a UE 115, as described with reference to FIGS. 1 and 2.

In the following description of the process flow 300, the operations between the base station 105-*b*, the UE 115-*d*, and the UE 115-*e* may be transmitted in a different order than the example order shown, or the operations performed by the base station 105-*b*, the UE 115-*d*, and the UE 115-*e* may be performed in different orders or at different times. Some operations may also be omitted from the process flow 300, and other operations may be added to the process flow 300.

At 305, the base station 105-*b* may identify a configuration for sidelink communications for the UE 115-*d*. In some examples, the configuration may be for a set of occasions configured for sidelink communications for the UE 115-*d*. In some examples, the sidelink communications may include at least one of sidelink traffic, semi-persistent scheduling traffic, or a combination thereof.

At 310, the base station 105-*b* may transmit, to the UE 115-*d*, the identified configuration indicating the set of occasions configured for sidelink communications for the UE 115-*d*. Upon receiving the configuration, the UE 115-*d* may determine multiple pre-scheduled occasions to perform sidelink communications.

At 315, the base station 105-*b* may determine that a first pre-scheduled occasion of the set of occasions configured for sidelink communications is suspended. For instance, the base station 105-*b* may identify higher priority traffic and may determine to suspend one or more pre-scheduled occasions configured for sidelink communications. Upon determining that the first pre-scheduled occasion of the set of occasions configured for sidelink communications is suspended, at 320, the base station 105-b may transmit a control indication associated with a radio network temporary identifier.

At 325, the UE 115-d may receive the control indication and may determine to skip the first pre-scheduled occasion of the set of occasions configured for sidelink communications based on the control indication. In one example, the UE 115-d may identify a number of frequency domain resource assignment bits included in the control indication, where the radio network temporary identifier includes a cell radio network temporary identifier, and may determine to skip the first pre-scheduled occasion of the set of occasions based on identifying the number of frequency domain resource assignment bits. Additionally or alternatively, the UE 115-d may identify a type associated with a resource allocation and a length of a resource block associated with the control indication, and may determine to skip the first pre-scheduled occasion of the set of occasions based on identifying the type associated with the resource allocation and the length of the resource block. In some examples, a format associated with the control indication may be 0_0 and the length of the resource block may be zero.

In one example, the UE 115-d may identify a resource allocation field value associated with the control indication, and may determine to skip the first pre-scheduled occasion of the set of occasions based on identifying the resource allocation field value. In such an example, a format associated with the control indication may be 5A and the resource allocation field value may be zero.

At 330, the UE 115-d may skip the first pre-scheduled occasion of the set of occasions configured for sidelink communications based on the control indication. At 335, the UE 115-d may resume the sidelink communications. For example, the UE 115-d may perform sidelink communications during a second pre-scheduled occasion of the set of occasions after skipping the first pre-scheduled occasion.

Figure 4:
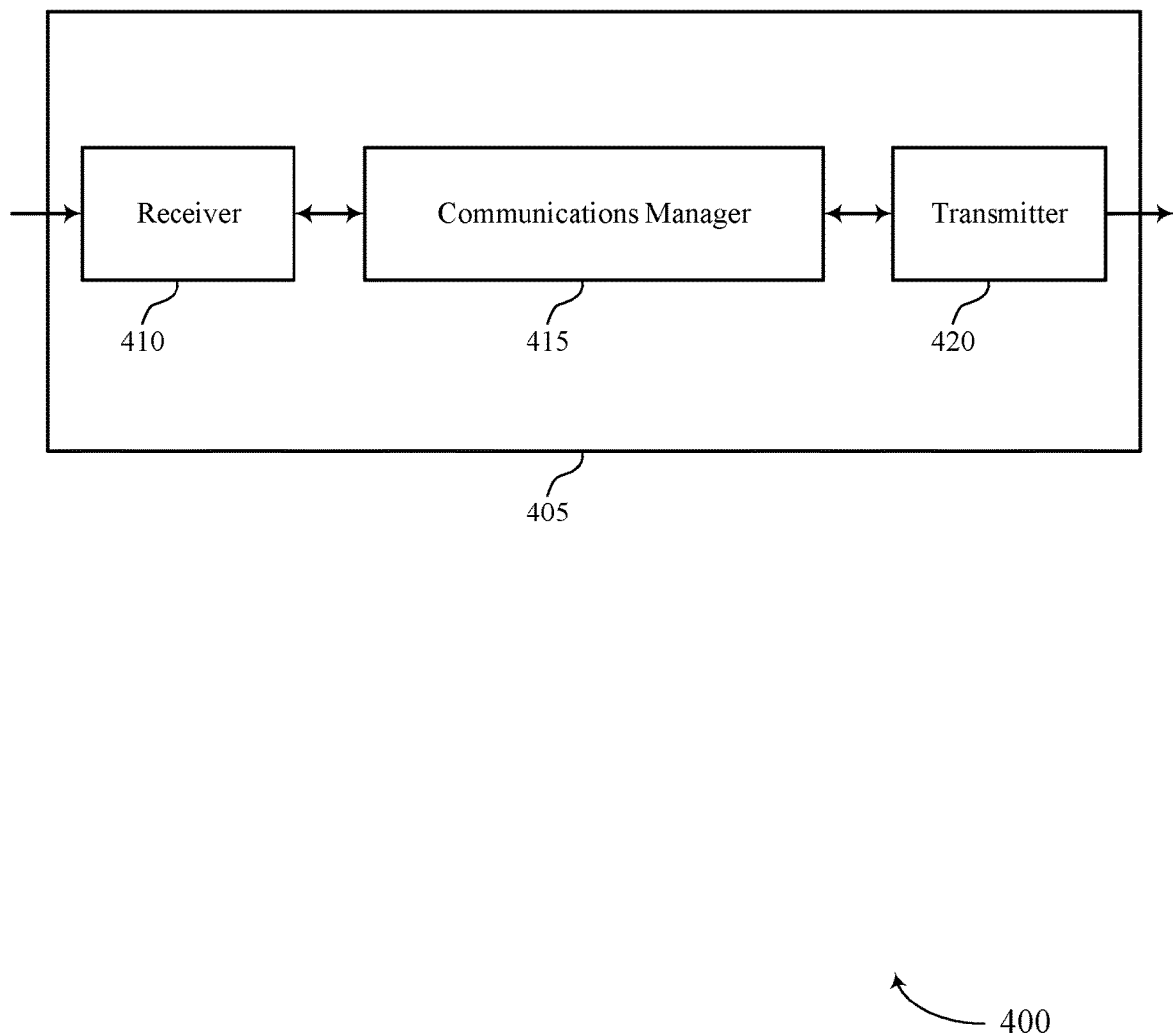
FIGS. 4 and 5 show block diagrams of devices that support suspension of pre-scheduled transmission in accordance with aspects of the present disclosure.

FIG. 4 shows a block diagram 400 of a device 405 that supports suspension of pre-scheduled transmission in accordance with aspects of the present disclosure. The device 405 may be an example of aspects of a UE 115 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to suspension of pre-scheduled transmission, etc.). Information may be passed on to other components of the device 405. The receiver 410 may be an example of aspects of the transceiver 720 described with reference to FIG. 7. The receiver 410 may utilize a single antenna or a set of antennas.

The communications manager 415 may receive, from a base station, a configuration indicating a set of occasions configured for sidelink communications for the UE, receive, from the base station, a control indication associated with a radio network temporary identifier, skip a first pre-scheduled occasion of the set of occasions configured for sidelink communications based on the control indication, and perform sidelink communications during a second pre-scheduled occasion of the set of occasions after skipping the first pre-scheduled occasion. The communications manager 415 may be an example of aspects of the communications manager 710 described herein.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

By including or configuring the communications manager 415 in accordance with examples as described herein, the device 405 (e.g., a processor controlling or otherwise coupled to the receiver 410, the transmitter 420, the communications manager 415, or a combination thereof) may support techniques for reduced processing, reduced power consumption, more efficient utilization of communication resources.

Figure 5:
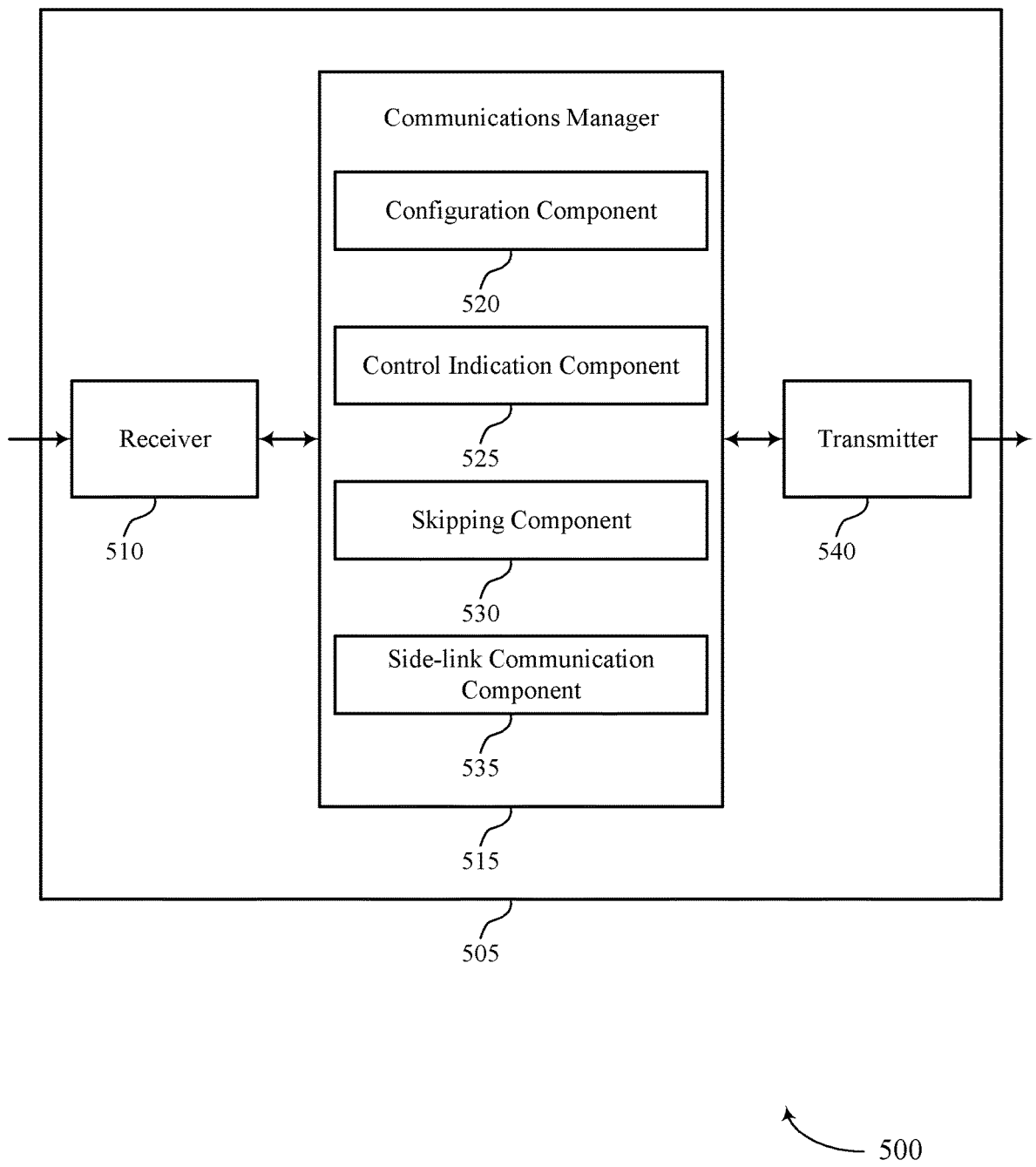

FIG. 5 shows a block diagram 500 of a device 505 that supports suspension of pre-scheduled transmission in accordance with aspects of the present disclosure. The device 505 may be an example of aspects of a device 405, or a UE 115 as described herein. The device 505 may include a receiver 510, a communications manager 515, and a transmitter 540. The device 505 may also include a processor. Each of these components may be in communication with one another (e.g., via one or more buses).

The receiver 510 may receive information such as packets, user data, or control information associated with various information channels (e.g., control channels, data channels, and information related to suspension of pre-scheduled transmission, etc.). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include a configuration component 520, a control indication component 525, a skipping component 530, and a sidelink communication component 535. The communications manager 515 may be an example of aspects of the communications manager 710 described herein.

The configuration component 520 may receive, from a base station, a configuration indicating a set of occasions configured for sidelink communications for the UE. The control indication component 525 may receive, from the base station, a control indication associated with a radio network temporary identifier. The skipping component 530 may skip a first pre-scheduled occasion of the set of occasions configured for sidelink communications based on the control indication. The sidelink communication component 535 may perform sidelink communications during a second pre-scheduled occasion of the set of occasions after skipping the first pre-scheduled occasion.

The transmitter 540 may transmit signals generated by other components of the device 505. In some examples, the transmitter 540 may be collocated with a receiver 510 in a transceiver module. For example, the transmitter 540 may be an example of aspects of the transceiver 720 described with reference to FIG. 7. The transmitter 540 may utilize a single antenna or a set of antennas.

Figure 6:
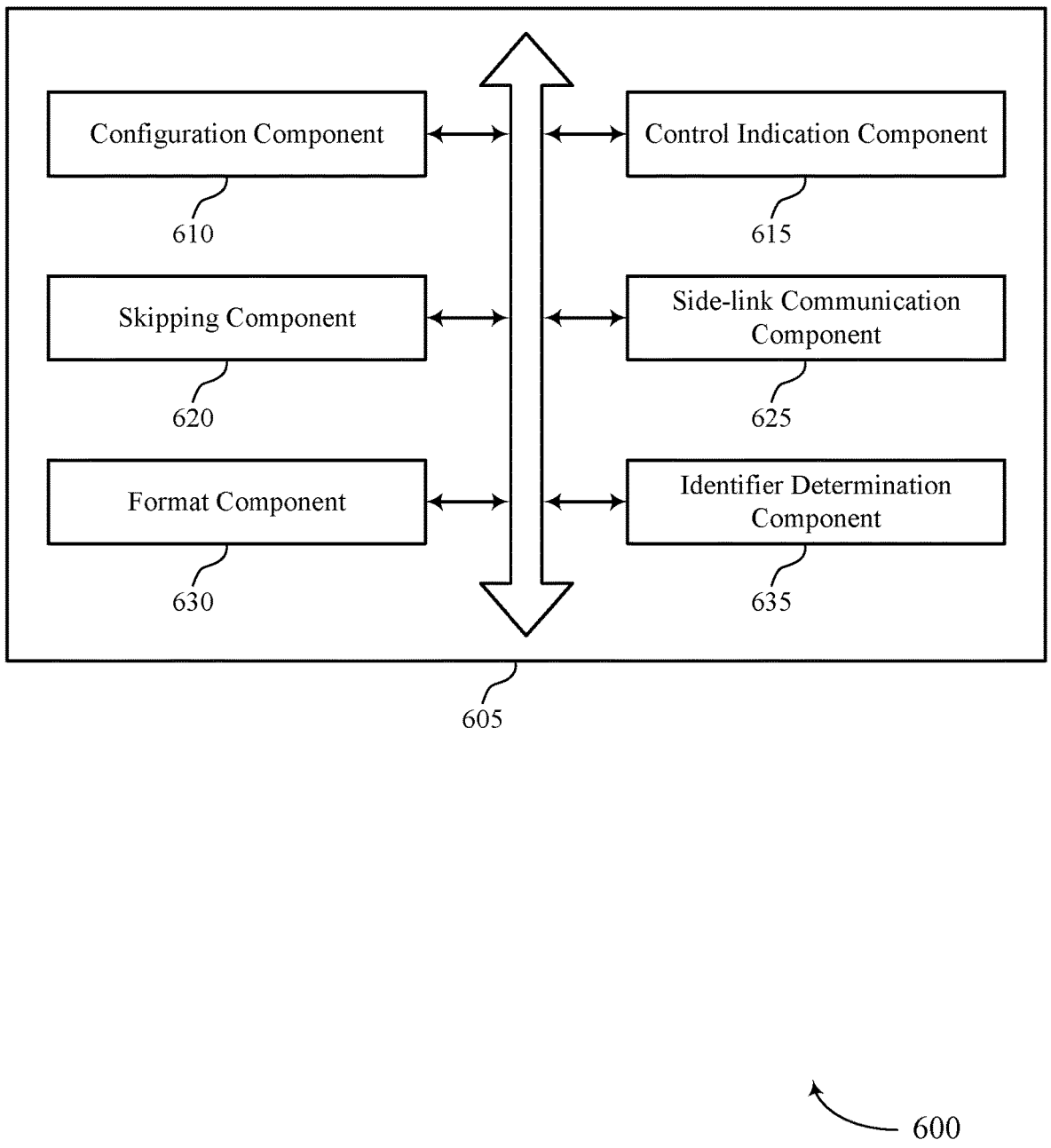
FIG. 6 shows a block diagram of a communications manager that supports suspension of pre-scheduled transmission in accordance with aspects of the present disclosure.

FIG. 6 shows a block diagram 600 of a communications manager 605 that supports suspension of pre-scheduled transmission in accordance with aspects of the present disclosure. The communications manager 605 may be an example of aspects of a communications manager 415, a communications manager 515, or a communications manager 710 described herein. The communications manager 605 may include a configuration component 610, a control indication component 615, a skipping component 620, a sidelink communication component 625, a format component 630, and an identifier determination component 635. Each of these modules may communicate, directly or indirectly, with one another (e.g., via one or more buses).

The configuration component 610 may receive, from a base station, a configuration indicating a set of occasions configured for sidelink communications for the UE. The control indication component 615 may receive, from the base station, a control indication associated with a radio network temporary identifier. In some cases, the control indication includes a downlink control information.

The skipping component 620 may skip a first pre-scheduled occasion of the set of occasions configured for sidelink communications based on the control indication. The sidelink communication component 625 may perform sidelink communications during a second pre-scheduled occasion of the set of occasions after skipping the first pre-scheduled occasion. In some cases, the sidelink communications includes at least one of sidelink traffic, semi-persistent scheduling traffic, or a combination thereof.

In some examples, identifying a number of frequency domain resource assignment bits included in the control indication, where the radio network temporary identifier includes a cell radio network temporary identifier. In some examples, the skipping component 620 may determine to skip the first pre-scheduled occasion of the set of occasions based on identifying the number of frequency domain resource assignment bits.

In some examples, the control indication component 615 may identify a type associated with a resource allocation and a length of a resource block associated with the control indication. In some examples, the skipping component 620 may determine to skip the first pre-scheduled occasion of the set of occasions based on identifying the type associated with the resource allocation and the length of the resource block. In some cases, a format associated with the control indication is 0_0 and the length of the resource block is zero.

In some examples, the control indication component 615 may identify a resource allocation field value associated with the control indication. In some examples, the skipping component 620 may determine to skip the first pre-scheduled occasion of the set of occasions based on identifying the resource allocation field value. In some cases, a format associated with the control indication is 5A and the resource allocation field value is zero.

The format component 630 may identify a format associated with the control indication and a bit included in the control indication. In some examples, the skipping component 620 may determine to skip the first pre-scheduled occasion of the set of occasions based on identifying the format associated with the control indication and the bit included in the control indication.

In some cases, the format associated with the control indication is 5A and the radio network temporary identifier includes a sidelink control information suspension radio network temporary identifier. In some cases, the format associated with the control indication is 0_0 and the radio network temporary identifier includes a semi-persistent scheduling suspension radio network temporary identifier.

The identifier determination component 635 may determine that the radio network temporary identifier is associated with a group of UEs. In some examples, the format component 630 may identify a format associated with the control indication and a frequency domain resource assignment bit associated with the control indication. In some examples, the skipping component 620 may determine to skip the first pre-scheduled occasion of the set of occasions based on identifying the format associated with the control indication and the frequency domain resource assignment bit.

In some cases, the format associated with the control indication is 0_0 and the radio network temporary identifier includes a group suspension radio network temporary identifier. In some cases, the format associated with the control indication is 5A and the radio network temporary identifier includes a group suspension radio network temporary identifier.

In some examples, the format component 630 may identify a format associated with the control indication and a frequency resource allocation field bit associated with the control indication. In some examples, the skipping component 620 may determine to skip the first pre-scheduled occasion of the set of occasions based on identifying the format associated with the control indication and the frequency resource allocation field bit.

In some examples, the identifier determination component 635 may receive a radio resource control signal from the base station. In some examples, the identifier determination component 635 may identify the radio network temporary identifier included in the radio resource control signal.

Figure 7:
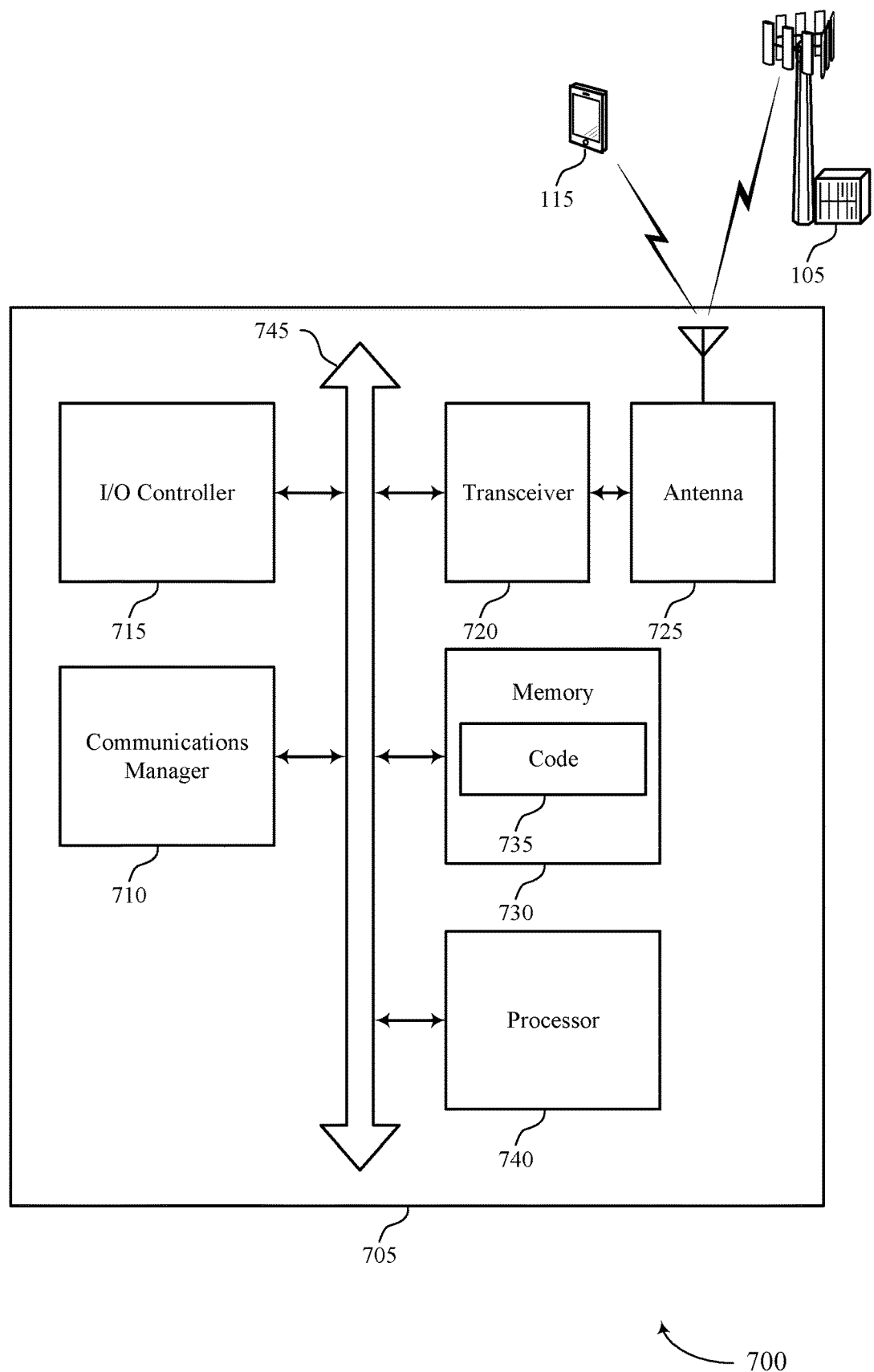
FIG. 7 shows a diagram of a system including a device that supports suspension of pre-scheduled transmission in accordance with aspects of the present disclosure.

FIG. 7 shows a diagram of a system 700 including a device 705 that supports suspension of pre-scheduled transmission in accordance with aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communications manager 710 may receive, from a base station, a configuration indicating a set of occasions configured for sidelink communications for the UE, receive, from the base station, a control indication associated with a radio network temporary identifier, skip a first pre-scheduled occasion of the set of occasions configured for sidelink communications based on the control indication, and perform sidelink communications during a second pre-scheduled occasion of the set of occasions after skipping the first pre-scheduled occasion.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described herein. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include random-access memory (RAM) and read-only memory (ROM). The memory 730 may store computer-readable, computer-executable code 735 including instructions that, when executed, cause the processor to perform various functions described herein. In some cases, the memory 730 may contain, among other things, a Basic Input/Output System (BIOS) which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting suspension of pre-scheduled transmission).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

By including or configuring the communications manager 710 in accordance with examples as described herein, the device 705 may support techniques for improved communication reliability, reduced latency, improved user experience related to reduced processing, reduced power consumption, more efficient utilization of communication resources, improved coordination between devices, longer battery life, improved utilization of processing capability.

Figure 8:
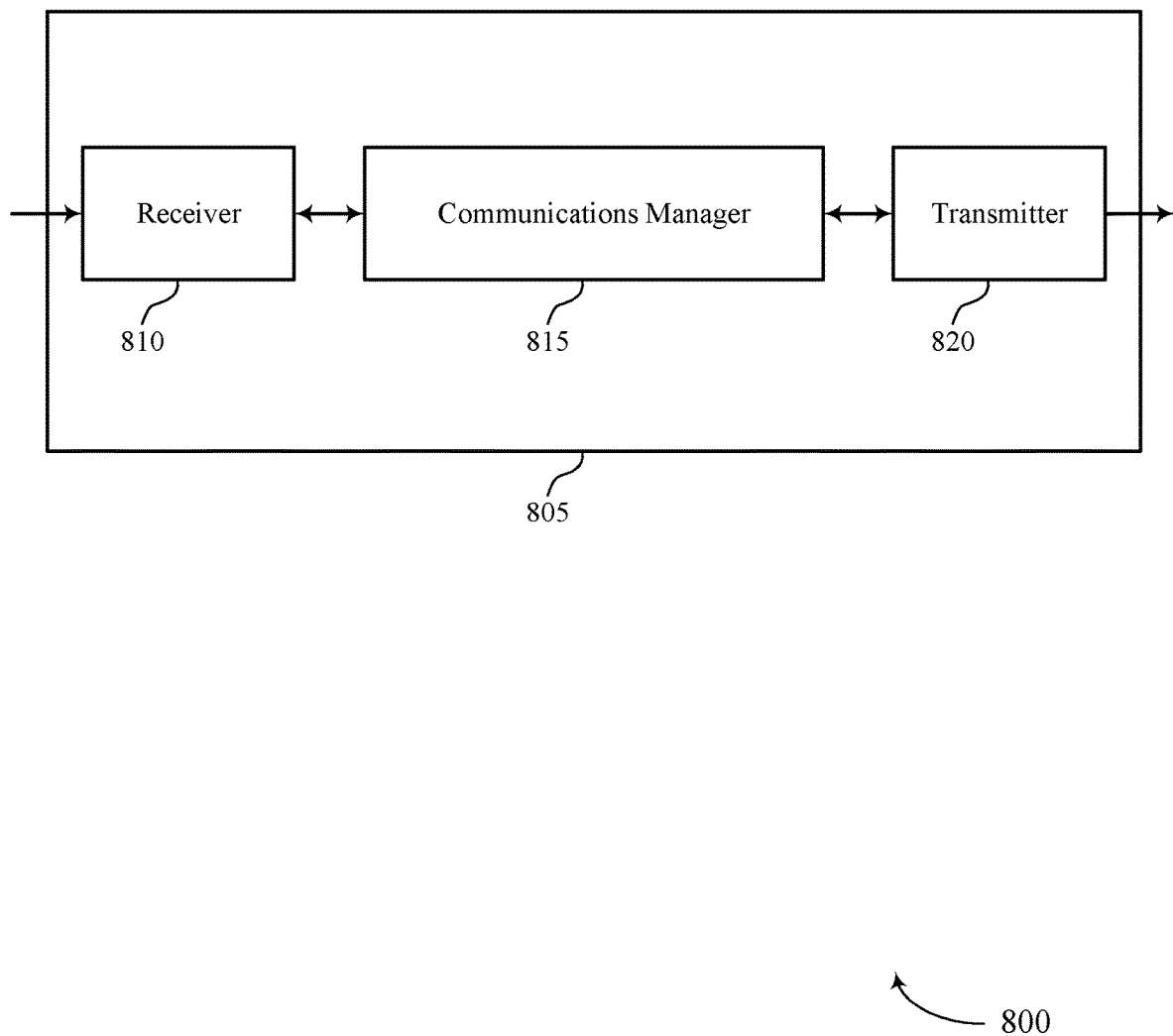
FIGS. 8 and 9 show block diagrams of devices that support suspension of pre-scheduled transmission in accordance with aspects of the present disclosure.

FIG. 8 shows a block diagram 800 of a device 805 that supports suspension of pre-scheduled transmission in accordance with aspects of the present disclosure. The device 805 may be an example of aspects of a base station 105 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to suspension of pre-scheduled transmission, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may transmit, to a UE, a configuration indicating a set of occasions configured for sidelink communications for the UE, determine that a first pre-scheduled occasion of the set of occasions configured for sidelink communications is suspended, transmit, to the UE, a control indication associated with a radio network temporary identifier based on determining that the first pre-scheduled occasion is suspended, and perform sidelink communications during a second pre-scheduled occasion of the set of occasions after the first pre-scheduled occasion is skipped at the UE. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

By including or configuring the communications manager 815 in accordance with examples as described herein, the device 805 (e.g., a processor controlling or otherwise coupled to the receiver 810, the transmitter 820, the communications manager 815, or a combination thereof) may support techniques for reduced processing, reduced power consumption, more efficient utilization of communication resources.

Figure 9:
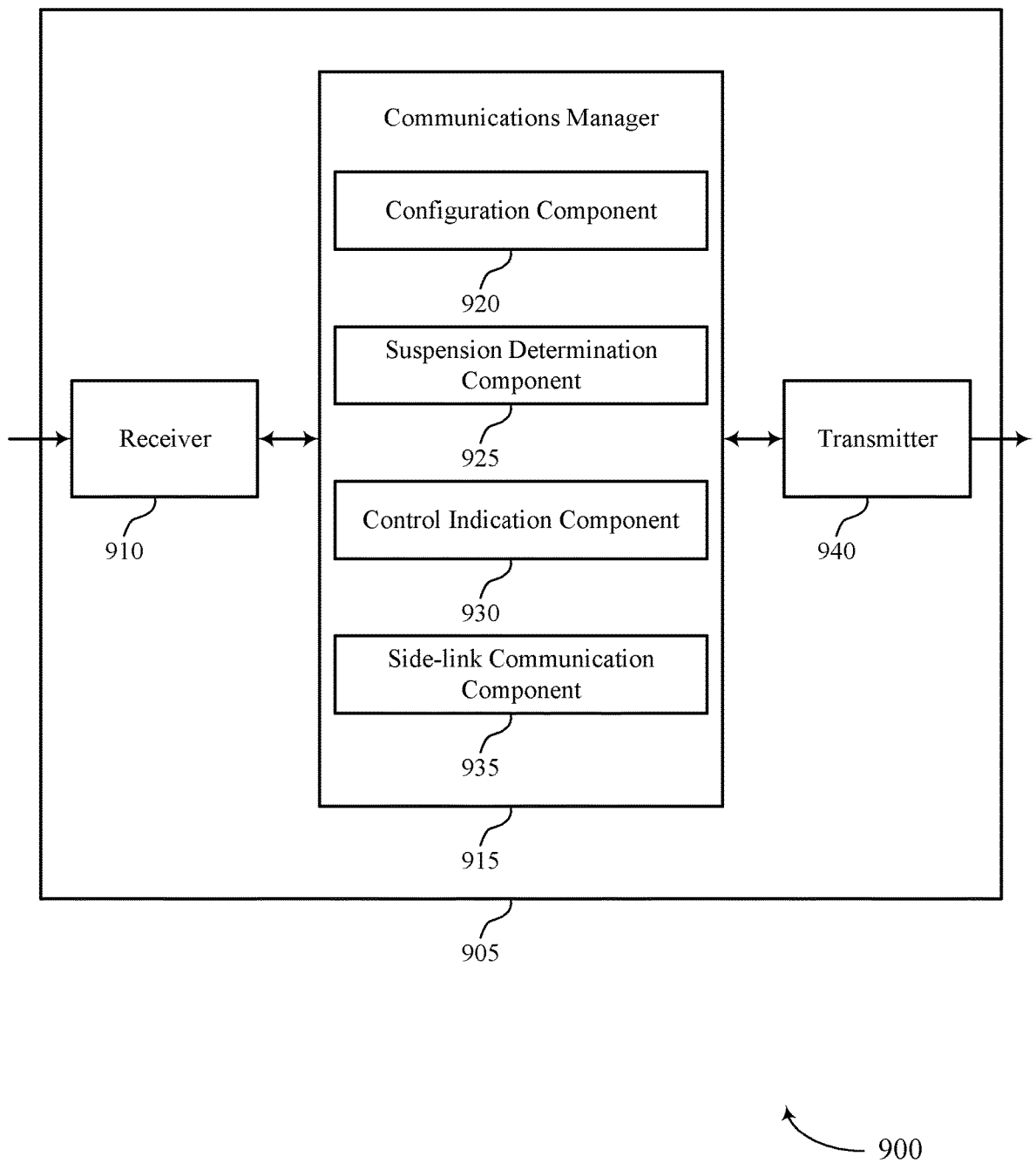

FIG. 9 shows a block diagram 900 of a device 905 that supports suspension of pre-scheduled transmission in accordance with aspects of the present disclosure. The device 905 may be an example of aspects of a device 805, or a base station 105 as described herein. The device 905 may include a receiver 910, a communications manager 915, and a transmitter 940. The device 905 may also include a processor. Each of these components may be in communication with one another (e.g., via one or more buses).

The receiver 910 may receive information such as packets, user data, or control information associated with various information channels (e.g., control channels, data channels, and information related to suspension of pre-scheduled transmission, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a configuration component 920, a suspension determination component 925, a control indication component 930, and a sidelink communication component 935. The communications manager 915 may be an example of aspects of the communications manager 1110 described herein.

The configuration component 920 may transmit, to a UE, a configuration indicating a set of occasions configured for sidelink communications for the UE. The suspension determination component 925 may determine that a first pre-scheduled occasion of the set of occasions configured for sidelink communications is suspended. The control indication component 930 may transmit, to the UE, a control indication associated with a radio network temporary identifier based on determining that the first pre-scheduled occasion is suspended. The sidelink communication component 935 may perform sidelink communications during a second pre-scheduled occasion of the set of occasions after the first pre-scheduled occasion is skipped at the UE.

The transmitter 940 may transmit signals generated by other components of the device 905. In some examples, the transmitter 940 may be collocated with a receiver 910 in a transceiver module. For example, the transmitter 940 may be an example of aspects of the transceiver 1120 described with reference to FIG. 11. The transmitter 940 may utilize a single antenna or a set of antennas.

Figure 10:
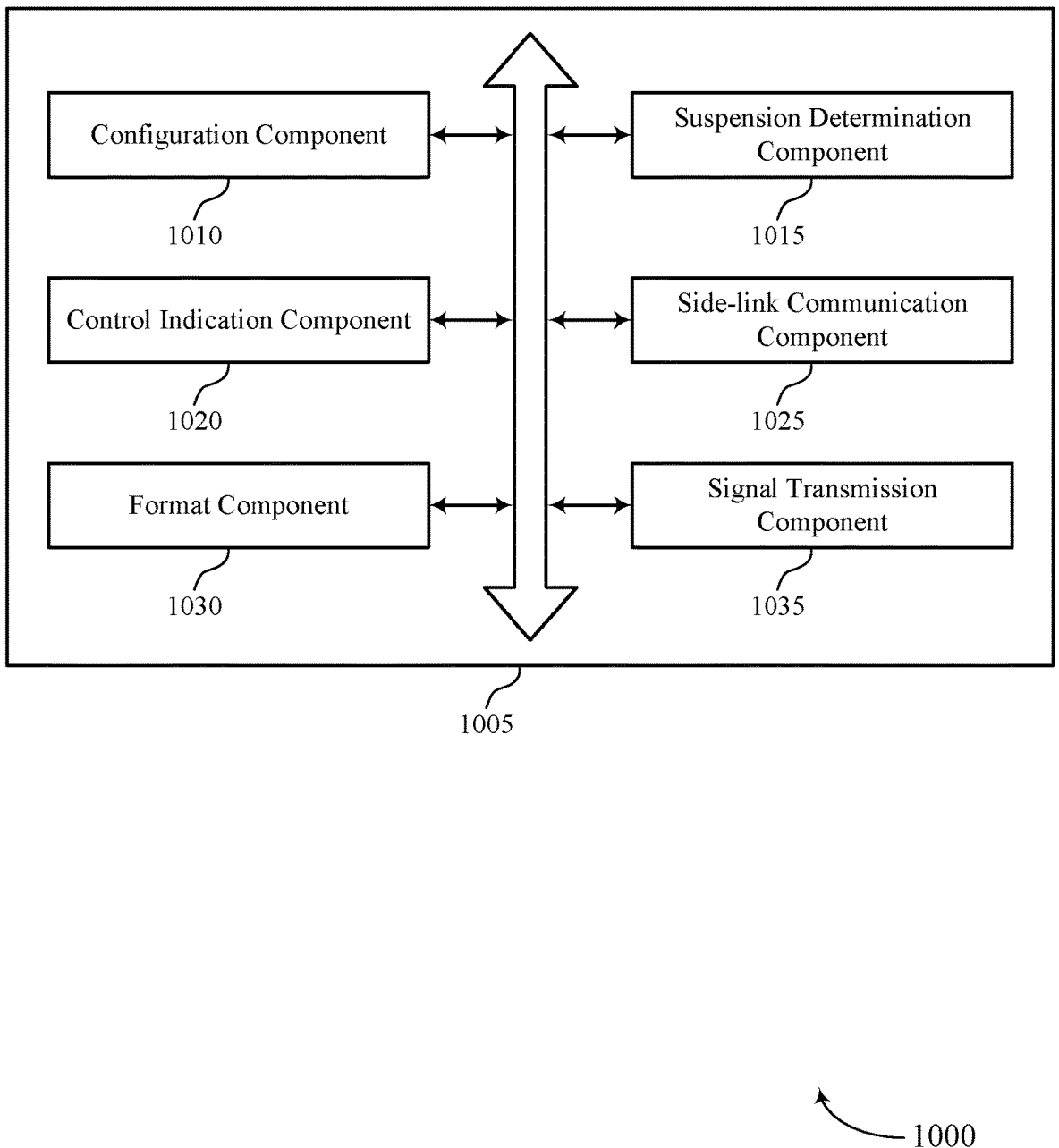
FIG. 10 shows a block diagram of a communications manager that supports suspension of pre-scheduled transmission in accordance with aspects of the present disclosure.

FIG. 10 shows a block diagram 1000 of a communications manager 1005 that supports suspension of pre-scheduled transmission in accordance with aspects of the present disclosure. The communications manager 1005 may be an example of aspects of a communications manager 815, a communications manager 915, or a communications manager 1110 described herein. The communications manager 1005 may include a configuration component 1010, a suspension determination component 1015, a control indication component 1020, a sidelink communication component 1025, a format component 1030, and a signal transmission component 1035. Each of these modules may communicate, directly or indirectly, with one another (e.g., via one or more buses).

The configuration component 1010 may transmit, to a UE, a configuration indicating a set of occasions configured for sidelink communications for the UE. The suspension determination component 1015 may determine that a first pre-scheduled occasion of the set of occasions configured for sidelink communications is suspended. The control indication component 1020 may transmit, to the UE, a control indication associated with a radio network temporary identifier based on determining that the first pre-scheduled occasion is suspended. In some cases, the control indication includes a downlink control information.

The sidelink communication component 1025 may perform sidelink communications during a second pre-scheduled occasion of the set of occasions after the first pre-scheduled occasion is skipped at the UE. In some cases, the sidelink communications includes at least one of sidelink traffic, semi-persistent scheduling traffic, or a combination thereof.

In some examples, the control indication component 1020 may identify a number of frequency domain resource assignment bits to be included in the control indication, where the radio network temporary identifier includes a cell radio network temporary identifier. In some examples, the configuration component 1010 may configure the UE to skip the first pre-scheduled occasion of the set of occasions based on the number of frequency domain resource assignment bits.

In some examples, the control indication component 1020 may identify a type associated with a resource allocation and a length of a resource block associated with the control indication. In some examples, the configuration component 1010 may configure the UE to skip the first pre-scheduled occasion of the set of occasions based on the type associated with the resource allocation and the length of the resource block.

In some cases, a format associated with the control indication is 0_0 and the length of the resource block is zero. In some cases, a format associated with the control indication is 5A and the resource allocation field value is zero.

In some examples, the control indication component 1020 may identify a resource allocation field value associated with the control indication. In some examples, the configuration component 1010 may configure the UE to skip the first pre-scheduled occasion of the set of occasions based on the resource allocation field value.

The format component 1030 may identify a format associated with the control indication and a bit included in the control indication. In some examples, the configuration component 1010 may configure the UE to skip the first pre-scheduled occasion of the set of occasions based on the format associated with the control indication and the bit included in the control indication.

In some cases, the format associated with the control indication is 5A and the radio network temporary identifier includes a sidelink control information suspension radio network temporary identifier. In some cases, the format associated with the control indication is 0_0 and the radio network temporary identifier includes a semi-persistent scheduling suspension radio network temporary identifier.

In some examples, the format component 1030 may identify a format associated with the control indication and a frequency domain resource assignment bit associated with the control indication. In some examples, the configuration component 1010 may configure the UE to skip the first pre-scheduled occasion of the set of occasions based on the format associated with the control indication and the frequency domain resource assignment bit.

In some examples, the control indication component 1020 may transmit, to a second UE, the control indication associated with radio network temporary identifier. In some cases, the format associated with the control indication is 0_0 and the radio network temporary identifier includes a group suspension radio network temporary identifier.

In some examples, the format component 1030 may identify a format associated with the control indication and a frequency resource allocation field bit associated with the control indication. In some examples, the configuration component 1010 may configure the UE to skip the first pre-scheduled occasion of the set of occasions based on the format associated with the control indication and the frequency resource allocation field bit. In some cases, the format associated with the control indication is 5A and the radio network temporary identifier includes a group suspension radio network temporary identifier. The signal transmission component 1035 may transmit a radio resource control signal to the UE, the radio resource control signal including the radio network temporary identifier.

Figure 11:
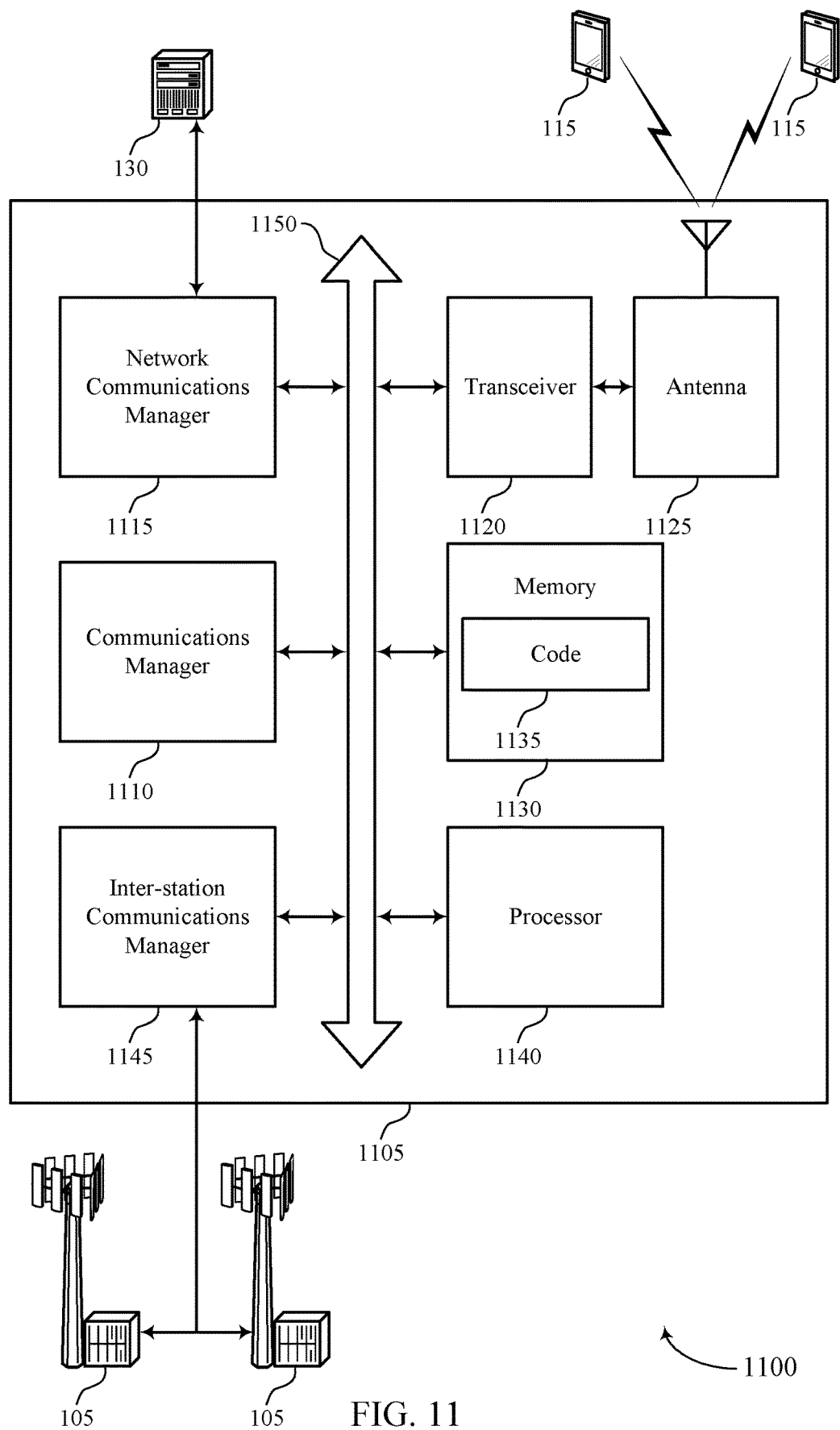
FIG. 11 shows a diagram of a system including a device that supports suspension of pre-scheduled transmission in accordance with aspects of the present disclosure.

FIG. 11 shows a diagram of a system 1100 including a device 1105 that supports suspension of pre-scheduled transmission in accordance with aspects of the present disclosure. The device 1105 may be an example of or include the components of device 805, device 905, or a base station 105 as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be in electronic communication via one or more buses (e.g., bus 1150).

The communications manager 1110 may transmit, to a UE, a configuration indicating a set of occasions configured for sidelink communications for the UE, determine that a first pre-scheduled occasion of the set of occasions configured for sidelink communications is suspended, transmit, to the UE, a control indication associated with a radio network temporary identifier based on determining that the first pre-scheduled occasion is suspended, and perform sidelink communications during a second pre-scheduled occasion of the set of occasions after the first pre-scheduled occasion is skipped at the UE.

The network communications manager 1115 may manage communications with the core network (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described herein. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some cases, a memory controller may be integrated into processor 1140. The processor 1140 may be configured to execute computer-readable instructions stored in a memory (e.g., the memory 1130) to cause the device 1105 to perform various functions (e.g., functions or tasks supporting suspension of pre-scheduled transmission).

The inter-station communications manager 1145 may manage communications with other base station 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

By including or configuring the communications manager 1110 in accordance with examples as described herein, the device 1105 may support techniques for improved communication reliability, reduced latency, improved user experience related to reduced processing, reduced power consumption, more efficient utilization of communication resources, improved coordination between devices, longer battery life, improved utilization of processing capability.

Figure 12:
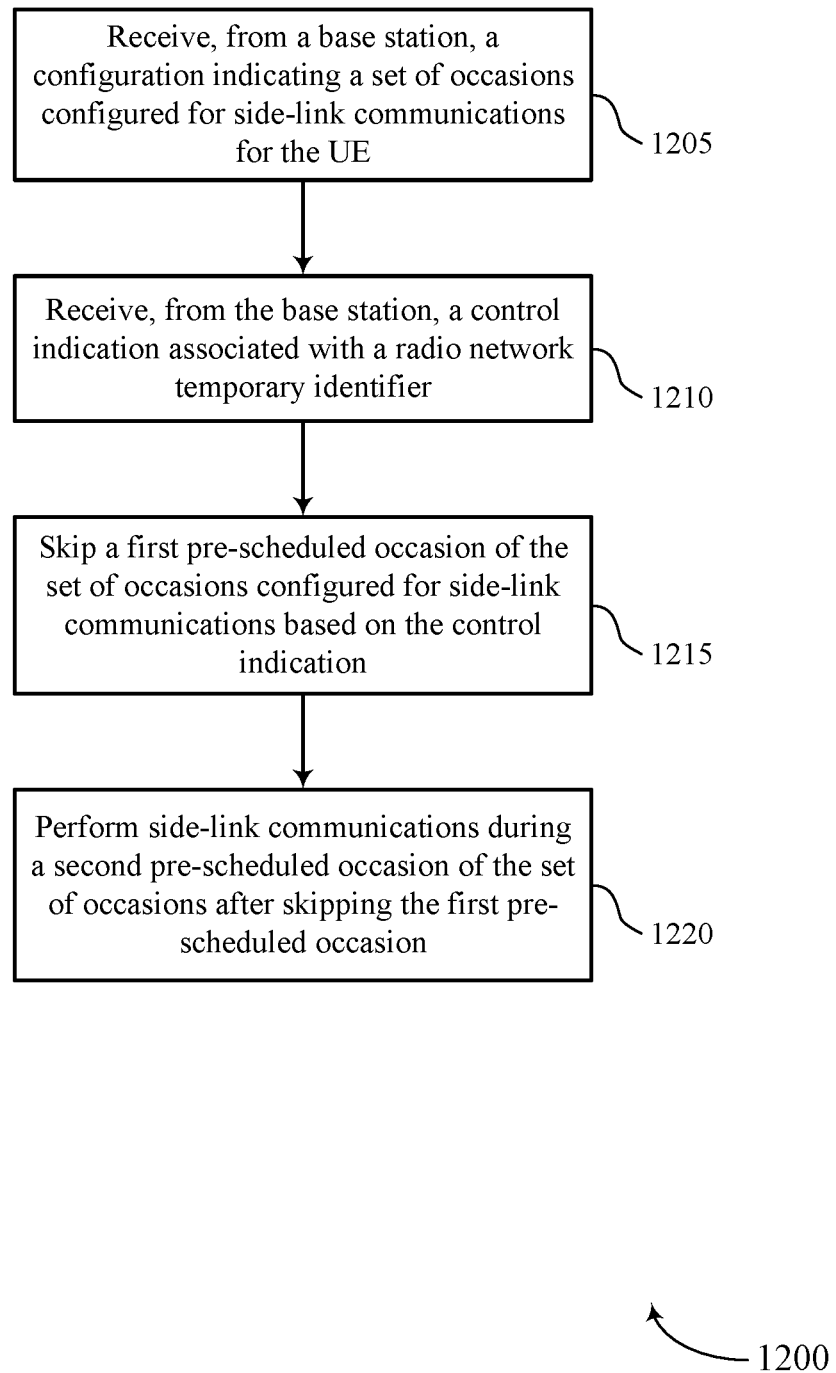
FIGS. 12 through 15 show flowcharts illustrating methods that support suspension of pre-scheduled transmission in accordance with aspects of the present disclosure.

FIG. 12 shows a flowchart illustrating a method 1200 that supports suspension of pre-scheduled transmission in accordance with aspects of the present disclosure. The operations of method 1200 may be implemented by a UE 115 or its components as described herein. For example, the operations of method 1200 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1205, the UE may receive, from a base station, a configuration indicating a set of occasions configured for sidelink communications for the UE. The operations of 1205 may be performed according to the methods described herein. In some examples, aspects of the operations of 1205 may be performed by a configuration component as described with reference to FIGS. 4 through 7.

At 1210, the UE may receive, from the base station, a control indication associated with a radio network temporary identifier. The operations of 1210 may be performed according to the methods described herein. In some examples, aspects of the operations of 1210 may be performed by a control indication component as described with reference to FIGS. 4 through 7.

At 1215, the UE may skip a first pre-scheduled occasion of the set of occasions configured for sidelink communications based on the control indication. The operations of 1215 may be performed according to the methods described herein. In some examples, aspects of the operations of 1215 may be performed by a skipping component as described with reference to FIGS. 4 through 7.

At 1220, the UE may perform sidelink communications during a second pre-scheduled occasion of the set of occasions after skipping the first pre-scheduled occasion. The operations of 1220 may be performed according to the methods described herein. In some examples, aspects of the operations of 1220 may be performed by a sidelink communication component as described with reference to FIGS. 4 through 7.

Figure 13:
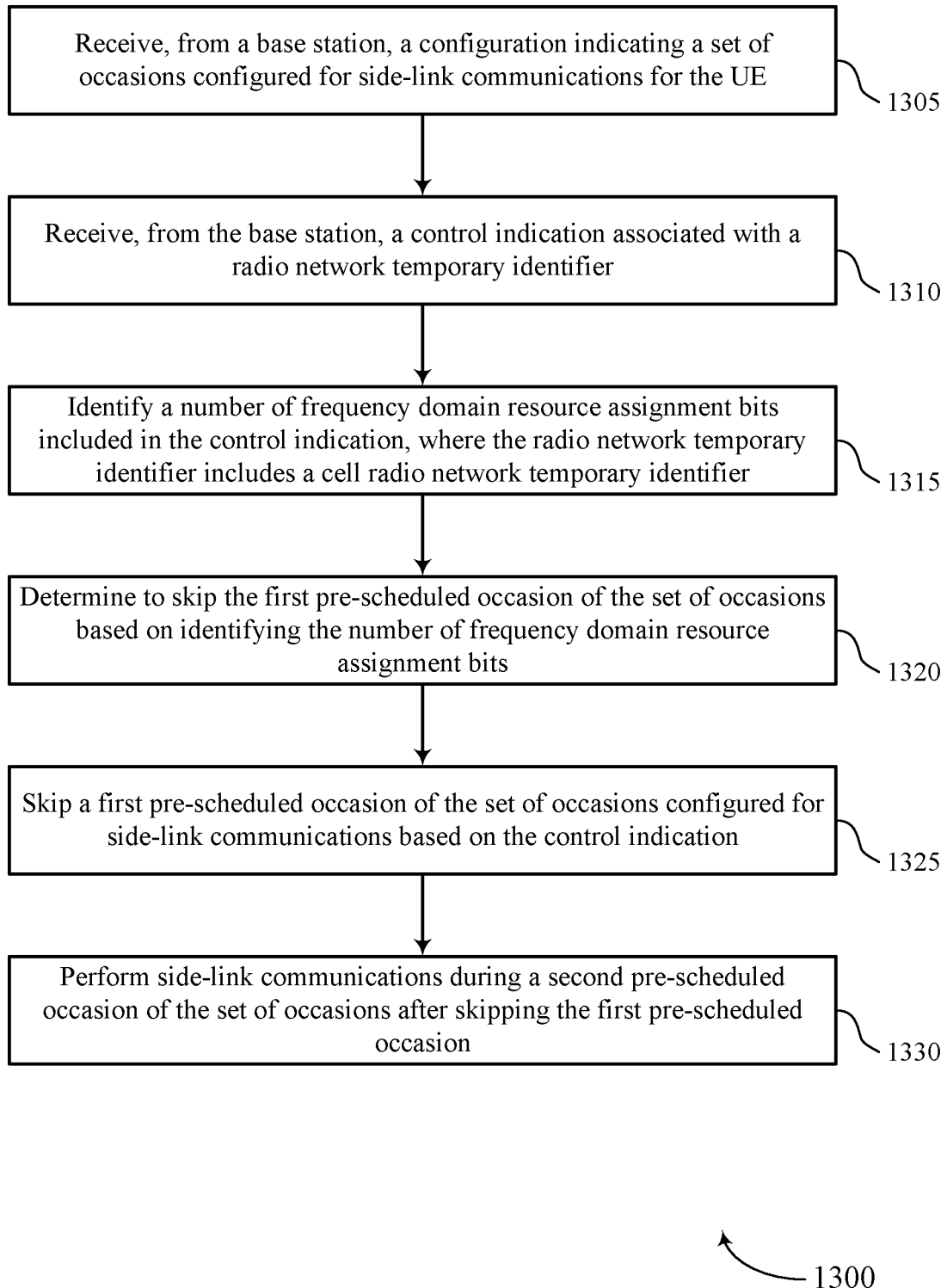

FIG. 13 shows a flowchart illustrating a method 1300 that supports suspension of pre-scheduled transmission in accordance with aspects of the present disclosure. The operations of method 1300 may be implemented by a UE 115 or its components as described herein. For example, the operations of method 1300 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1305, the UE may receive, from a base station, a configuration indicating a set of occasions configured for sidelink communications for the UE. The operations of 1305 may be performed according to the methods described herein. In some examples, aspects of the operations of 1305 may be performed by a configuration component as described with reference to FIGS. 4 through 7.

At 1310, the UE may receive, from the base station, a control indication associated with a radio network temporary identifier. The operations of 1310 may be performed according to the methods described herein. In some examples, aspects of the operations of 1310 may be performed by a control indication component as described with reference to FIGS. 4 through 7.

At 1315, the UE may identify a number of frequency domain resource assignment bits included in the control indication, where the radio network temporary identifier includes a cell radio network temporary identifier. The operations of 1315 may be performed according to the methods described herein. In some examples, aspects of the operations of 1315 may be performed by a control indication component as described with reference to FIGS. 4 through 7.

At 1320, the UE may determine to skip the first pre-scheduled occasion of the set of occasions based on identifying the number of frequency domain resource assignment bits. The operations of 1320 may be performed according to the methods described herein. In some examples, aspects of the operations of 1320 may be performed by a skipping component as described with reference to FIGS. 4 through 7.

At 1325, the UE may skip a first pre-scheduled occasion of the set of occasions configured for sidelink communications based on the control indication. The operations of 1325 may be performed according to the methods described herein. In some examples, aspects of the operations of 1325 may be performed by a skipping component as described with reference to FIGS. 4 through 7.

At 1330, the UE may perform sidelink communications during a second pre-scheduled occasion of the set of occasions after skipping the first pre-scheduled occasion. The operations of 1330 may be performed according to the methods described herein. In some examples, aspects of the operations of 1330 may be performed by a sidelink communication component as described with reference to FIGS. 4 through 7.

Figure 14:
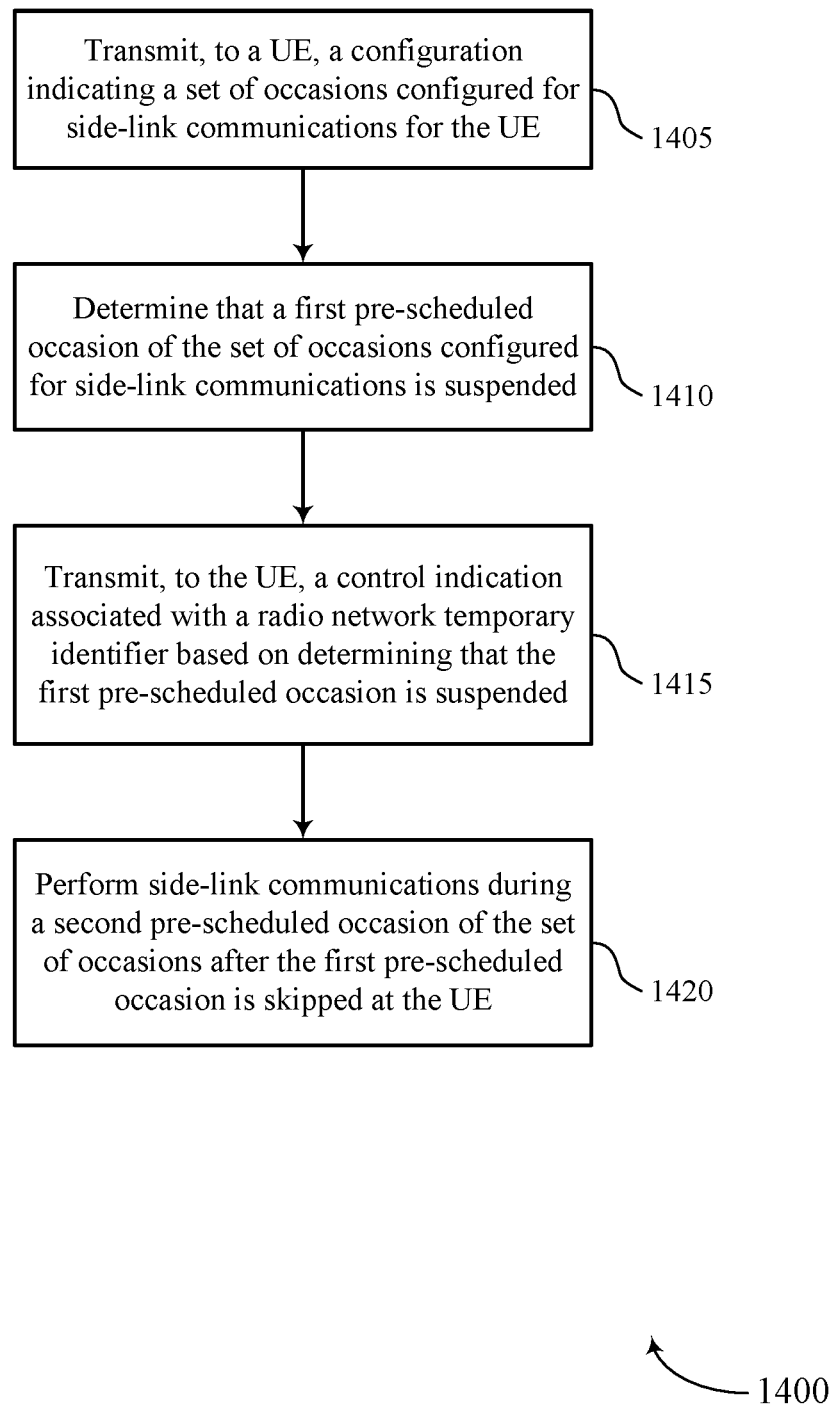

FIG. 14 shows a flowchart illustrating a method 1400 that supports suspension of pre-scheduled transmission in accordance with aspects of the present disclosure. The operations of method 1400 may be implemented by a base station 105 or its components as described herein. For example, the operations of method 1400 may be performed by a communications manager as described with reference to FIGS. 8 through 11. In some examples, a base station may execute a set of instructions to control the functional elements of the base station to perform the functions described herein. Additionally or alternatively, a base station may perform aspects of the functions described herein using special-purpose hardware.

At 1405, the base station may transmit, to a UE, a configuration indicating a set of occasions configured for sidelink communications for the UE. The operations of 1405 may be performed according to the methods described herein. In some examples, aspects of the operations of 1405 may be performed by a configuration component as described with reference to FIGS. 8 through 11.

At 1410, the base station may determine that a first pre-scheduled occasion of the set of occasions configured for sidelink communications is suspended. The operations of 1410 may be performed according to the methods described herein. In some examples, aspects of the operations of 1410 may be performed by a suspension determination component as described with reference to FIGS. 8 through 11.

At 1415, the base station may transmit, to the UE, a control indication associated with a radio network temporary identifier based on determining that the first pre-scheduled occasion is suspended. The operations of 1415 may be performed according to the methods described herein. In some examples, aspects of the operations of 1415 may be performed by a control indication component as described with reference to FIGS. 8 through 11.

At 1420, the base station may perform sidelink communications during a second pre-scheduled occasion of the set of occasions after the first pre-scheduled occasion is skipped at the UE. The operations of 1420 may be performed according to the methods described herein. In some examples, aspects of the operations of 1420 may be performed by a sidelink communication component as described with reference to FIGS. 8 through 11.

Figure 15:
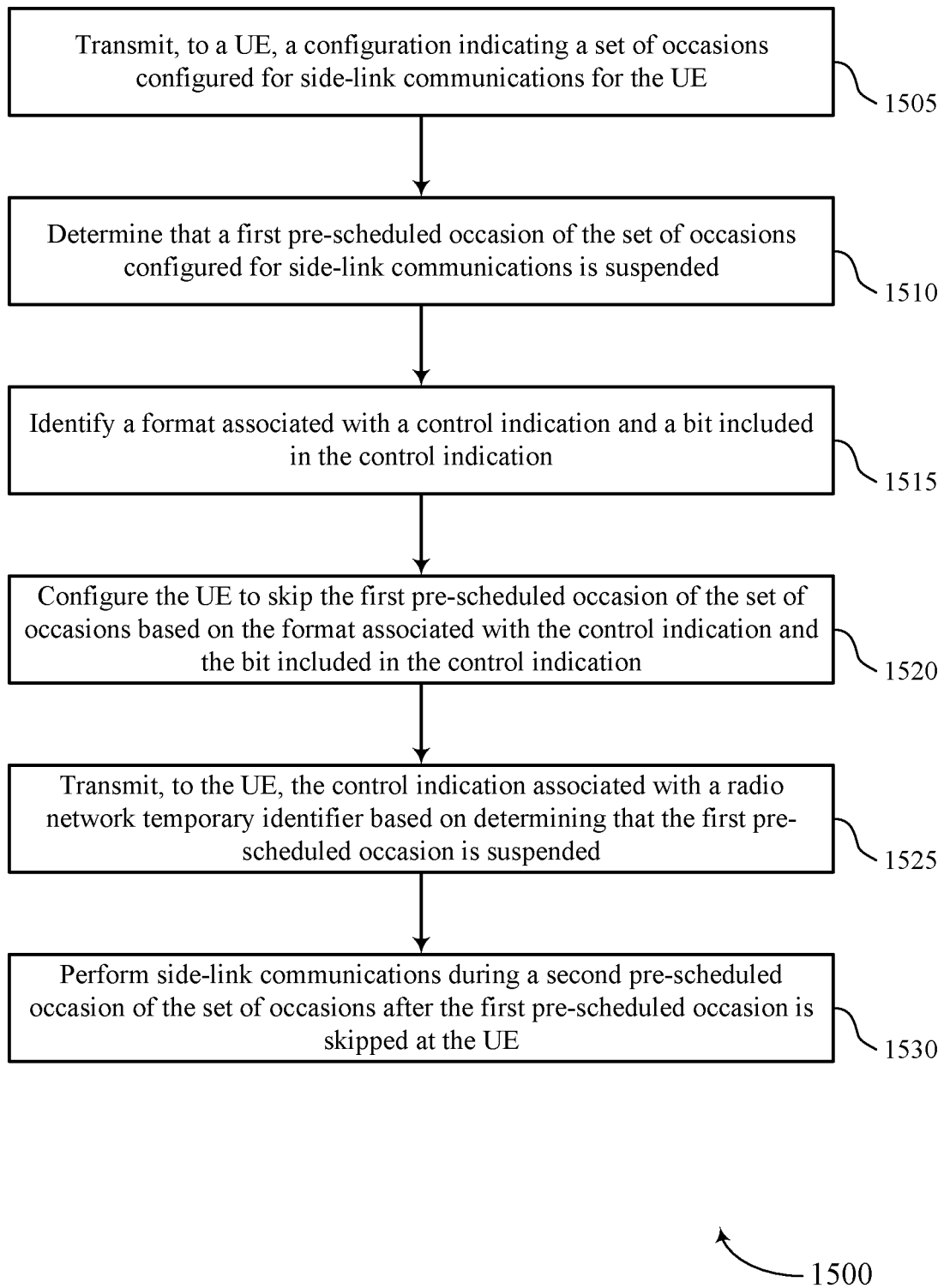

FIG. 15 shows a flowchart illustrating a method 1500 that supports suspension of pre-scheduled transmission in accordance with aspects of the present disclosure. The operations of method 1500 may be implemented by a base station 105 or its components as described herein. For example, the operations of method 1500 may be performed by a communications manager as described with reference to FIGS. 8 through 11. In some examples, a base station may execute a set of instructions to control the functional elements of the base station to perform the functions described herein. Additionally or alternatively, a base station may perform aspects of the functions described herein using special-purpose hardware.

At 1505, the base station may transmit, to a UE, a configuration indicating a set of occasions configured for sidelink communications for the UE. The operations of 1505 may be performed according to the methods described herein. In some examples, aspects of the operations of 1505 may be performed by a configuration component as described with reference to FIGS. 8 through 11.

At 1510, the base station may determine that a first pre-scheduled occasion of the set of occasions configured for sidelink communications is suspended. The operations of 1510 may be performed according to the methods described herein. In some examples, aspects of the operations of 1510 may be performed by a suspension determination component as described with reference to FIGS. 8 through 11.

At 1515, the base station may identify a format associated with a control indication and a bit included in the control indication. The operations of 1515 may be performed according to the methods described herein. In some examples, aspects of the operations of 1515 may be performed by a format component as described with reference to FIGS. 8 through 11.

At 1520, the base station may configure the UE to skip the first pre-scheduled occasion of the set of occasions based on the format associated with the control indication and the bit included in the control indication. The operations of 1520 may be performed according to the methods described herein. In some examples, aspects of the operations of 1520 may be performed by a configuration component as described with reference to FIGS. 8 through 11.

At 1525, the base station may transmit, to the UE, the control indication associated with a radio network temporary identifier based on determining that the first pre-scheduled occasion is suspended. The operations of 1525 may be performed according to the methods described herein. In some examples, aspects of the operations of 1525 may be performed by a control indication component as described with reference to FIGS. 8 through 11.

At 1530, the base station may perform sidelink communications during a second pre-scheduled occasion of the set of occasions after the first pre-scheduled occasion is skipped at the UE. The operations of 1530 may be performed according to the methods described herein. In some examples, aspects of the operations of 1530 may be performed by a sidelink communication component as described with reference to FIGS. 8 through 11.

It should be noted that the methods described herein describe possible implementations, and that the operations and the steps may be rearranged or otherwise modified and that other implementations are possible. Further, aspects from two or more of the methods may be combined.

The following aspects are given by way of illustration. Aspects of the following examples may be combined with aspects shown or discussed in relation to the figures or elsewhere herein.

Aspect 1 is a method for wireless communication at a UE that includes receiving, from a base station, a configuration indicating a set of occasions configured for sidelink communications for the UE; receiving, from the base station, a control indication associated with a radio network temporary identifier; skipping a first pre-scheduled occasion of the set of occasions configured for sidelink communications based at least in part on the control indication; and performing sidelink communications during a second pre-scheduled occasion of the set of occasions after skipping the first pre-scheduled occasion.

In Aspect 2, the method of aspect 1 includes identifying a number of frequency domain resource assignment bits included in the control indication, wherein the radio network temporary identifier comprises a cell radio network temporary identifier; and determining to skip the first pre-scheduled occasion of the set of occasions based at least in part on identifying the number of frequency domain resource assignment bits.

In Aspect 3, the method of any of aspects 1-2 further includes identifying a type associated with a resource allocation and a length of a resource block associated with the control indication; and determining to skip the first pre-scheduled occasion of the set of occasions based at least in part on identifying the type associated with the resource allocation and the length of the resource block.

In Aspect 4, the method of any of aspects 1-3 wherein a format associated with the control indication is 0_0 and the length of the resource block is zero.

In Aspect 5, the method of any of aspects 1-4 further includes identifying a resource allocation field value associated with the control indication; and determining to skip the first pre-scheduled occasion of the set of occasions based at least in part on identifying the resource allocation field value.

In Aspect 6, the method of any of aspects 1-5 wherein a format associated with the control indication is 5A and the resource allocation field value is zero.

In Aspect 7, the method of any of aspects 1-6 further includes identifying a format associated with the control indication and a bit included in the control indication; and determining to skip the first pre-scheduled occasion of the set of occasions based at least in part on identifying the format associated with the control indication and the bit included in the control indication.

In Aspect 8, the method of any of aspects 1-7 wherein the format associated with the control indication is 5A and the radio network temporary identifier comprises a sidelink control information suspension radio network temporary identifier.

In Aspect 9, the method of any of aspects 1-7 wherein the format associated with the control indication is 0_0 and the radio network temporary identifier comprises a semi-persistent scheduling suspension radio network temporary identifier.

In Aspect 10, the method of any of aspects 1-9 further includes determining that the radio network temporary identifier is associated with a group of UEs; identifying a format associated with the control indication and a frequency domain resource assignment bit associated with the control indication; and determining to skip the first pre-scheduled occasion of the set of occasions based at least in part on identifying the format associated with the control indication and the frequency domain resource assignment bit.

In Aspect 11, the method of any of aspects 1-10 wherein the format associated with the control indication is 0_0 and the radio network temporary identifier comprises a group suspension radio network temporary identifier.

In Aspect 12, the method of any of aspects 1-10 wherein the format associated with the control indication is 5A and the radio network temporary identifier comprises a group suspension radio network temporary identifier.

In Aspect 13, the method of any of aspects 1-12 further includes determining that the radio network temporary identifier is associated with a group of UEs; identifying a format associated with the control indication and a frequency resource allocation field bit associated with the control indication; and determining to skip the first pre-scheduled occasion of the set of occasions based at least in part on identifying the format associated with the control indication and the frequency resource allocation field bit.

In Aspect 14, the method of any of aspects 1-13 further includes receiving a radio resource control signal from the base station; and identifying the radio network temporary identifier included in the radio resource control signal.

In Aspect 15, the method of any of aspects 1-14 wherein the sidelink communications comprises at least one of sidelink traffic, semi-persistent scheduling traffic, or a combination thereof In Aspect 16, the method of any of aspects 1-15 wherein the control indication comprises a downlink control information.

Aspect 17 is a method for wireless communication at a base station that includes transmitting, to a UE, a configuration indicating a set of occasions configured for sidelink communications for the UE; determining that a first pre-scheduled occasion of the set of occasions configured for sidelink communications is suspended; transmitting, to the UE, a control indication associated with a radio network temporary identifier based at least in part on determining that the first pre-scheduled occasion is suspended; and performing sidelink communications during a second pre-scheduled occasion of the set of occasions after the first pre-scheduled occasion is skipped at the UE.

In Aspect 18, the method of aspect 17 includes identifying a number of frequency domain resource assignment bits to be included in the control indication, wherein the radio network temporary identifier comprises a cell radio network temporary identifier; and configuring the UE to skip the first pre-scheduled occasion of the set of occasions based at least in part on the number of frequency domain resource assignment bits.

In Aspect 19, the method of any of aspects 17-18 further includes identifying a type associated with a resource allocation and a length of a resource block associated with the control indication; and configuring the UE to skip the first pre-scheduled occasion of the set of occasions based at least in part on the type associated with the resource allocation and the length of the resource block.

In Aspect 20, the method of any of aspects 17-19 wherein a format associated with the control indication is 0_0 and the length of the resource block is zero.

In Aspect 21, the method of any of aspects 17-20 further includes identifying a resource allocation field value associated with the control indication; and configuring the UE to skip the first pre-scheduled occasion of the set of occasions based at least in part on the resource allocation field value.

In Aspect 22, the method of any of aspects 17-21 wherein a format associated with the control indication is 5A and the resource allocation field value is zero.

In Aspect 23, the method of any of aspects 17-22 further includes identifying a format associated with the control indication and a bit included in the control indication; and configuring the UE to skip the first pre-scheduled occasion of the set of occasions based at least in part on the format associated with the control indication and the bit included in the control indication.

In Aspect 24, the method of any of aspects 17-23 wherein the format associated with the control indication is 5A and the radio network temporary identifier comprises a sidelink control information suspension radio network temporary identifier.

In Aspect 25, the method of any of aspects 17-23 wherein the format associated with the control indication is 0_0 and the radio network temporary identifier comprises a semi-persistent scheduling suspension radio network temporary identifier.

In Aspect 26, the method of any of aspects 17-25 further includes identifying a format associated with the control indication and a frequency domain resource assignment bit associated with the control indication; and configuring the UE to skip the first pre-scheduled occasion of the set of occasions based at least in part on the format associated with the control indication and the frequency domain resource assignment bit.

In Aspect 27, the method of any of aspects 17-26 further includes transmitting, to a second UE, the control indication associated with radio network temporary identifier.

In Aspect 28, the method of any of aspects 17-27 wherein the format associated with the control indication is 0_0 and the radio network temporary identifier comprises a group suspension radio network temporary identifier.

In Aspect 29, the method of any of aspects 17-28 further includes identifying a format associated with the control indication and a frequency resource allocation field bit associated with the control indication; and configuring the UE to skip the first pre-scheduled occasion of the set of occasions based at least in part on the format associated with the control indication and the frequency resource allocation field bit.

In Aspect 30, the method of any of aspects 17-29 wherein the format associated with the control indication is 5A and the radio network temporary identifier comprises a group suspension radio network temporary identifier.

In Aspect 31, the method of any of aspects 17-30 further includes transmitting a radio resource control signal to the UE, the radio resource control signal including the radio network temporary identifier.

In Aspect 32, the method of any of aspects 17-31 wherein the sidelink communications comprises at least one of sidelink traffic, semi-persistent scheduling traffic, or a combination thereof In Aspect 33, the method of any of aspects 17-32 wherein the control indication comprises a downlink control information.

Aspect 34 is an apparatus including means for implementing a method or realizing an apparatus as in any of aspects 1-16.

Aspect 35 is an apparatus including means for implementing a method or realizing an apparatus as in any of aspects 17-33.

Aspect 36 is a non-transitory computer-readable medium storing instructions executable by one or more processors to cause the one or more processors to implement a method as in any of aspects 1-16.

Aspect 37 is a non-transitory computer-readable medium storing instructions executable by one or more processors to cause the one or more processors to implement a method as in any of aspects 17-33.

Aspect 38 is a system including one or more processors and memory in electronic communication with the one or more processors storing instructions executable by the one or more processors to cause the system or apparatus to implement a method as in any of aspects 1-16.

Aspect 38 is a system including one or more processors and memory in electronic communication with the one or more processors storing instructions executable by the one or more processors to cause the system or apparatus to implement a method as in any of aspects 17-33.

Aspects of these examples may be combined with aspects disclosed in other implementations.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving a configuration for a set of occasions that include respective time and frequency resources configured for pre-scheduled communications;
   receiving, via downlink control information, a control indication associated with a first occasion of the set of occasions;
   determining that at least one pre-scheduled communication in the first occasion of the set of occasions is suspended based at least in part on a radio network temporary identifier associated with the control indication and a format of the downlink control information; and
   performing one or more pre-scheduled communications during a second occasion of the set of occasions based at least in part on suspending the at least one pre-scheduled communication in the first occasion.

2. The method of claim 1, further comprising:
   identifying a number of frequency domain resource assignment bits included in the control indication, wherein the radio network temporary identifier comprises a cell radio network temporary identifier; and
   determining to skip the first occasion of the set of occasions based at least in part on identifying the number of frequency domain resource assignment bits.

3. The method of claim 1, further comprising:
   identifying a type associated with a resource allocation and a length of a resource block associated with the control indication; and
   determining to skip the first occasion of the set of occasions based at least in part on identifying the type associated with the resource allocation and the length of the resource block.

4. The method of claim 3, wherein a format associated with the control indication is 0_0 and the length of the resource block is zero.

5. The method of claim 1, further comprising:
   identifying a resource allocation field value associated with the control indication; and
   determining to skip the first occasion of the set of occasions based at least in part on identifying the resource allocation field value.

6. The method of claim 5, wherein a format associated with the control indication is 5A and the resource allocation field value is zero.

7. The method of claim 1, further comprising:
   identifying a format associated with the control indication and a bit included in the control indication; and
   determining to skip the first occasion of the set of occasions based at least in part on identifying the format associated with the control indication and the bit included in the control indication.

8. The method of claim 7, wherein the format associated with the control indication is 5A and the radio network temporary identifier comprises a sidelink control information suspension radio network temporary identifier.

9. The method of claim 7, wherein the format associated with the control indication is 0_0 and the radio network temporary identifier comprises a semi-persistent scheduling suspension radio network temporary identifier.

10. The method of claim 1, further comprising:
    determining that the radio network temporary identifier is associated with a group of UEs;
    identifying a format associated with the control indication and a frequency domain resource assignment bit associated with the control indication; and
    determining to skip the first occasion of the set of occasions based at least in part on identifying the format associated with the control indication and the frequency domain resource assignment bit.

11. The method of claim 10, wherein the format associated with the control indication is 0_0 and the radio network temporary identifier comprises a group suspension radio network temporary identifier.

12. The method of claim 10, wherein the format associated with the control indication is 5A and the radio network temporary identifier comprises a group suspension radio network temporary identifier.

13. The method of claim 1, further comprising:
    determining that the radio network temporary identifier is associated with a group of UEs;
    identifying a format associated with the control indication and a frequency resource allocation field bit associated with the control indication; and
    determining to skip the first occasion of the set of occasions based at least in part on identifying the format associated with the control indication and the frequency resource allocation field bit.

14. The method of claim 1, further comprising:
    receiving a radio resource control signal; and
    identifying the radio network temporary identifier included in the radio resource control signal.

15. The method of claim 1, wherein the one or more pre-scheduled communications comprise at least one of sidelink traffic, semi-persistent scheduling traffic, or a combination thereof.

16. The method of claim 1, wherein the control indication comprises a downlink control information.

17. A method for wireless communication at a network entity, comprising:
    transmitting a configuration for a set of occasions that include respective time and frequency resources configured for pre-scheduled communications;
    suspending at least one pre-scheduled communication in a first occasion of the set of occasions;
    transmitting, via downlink control information, a control indication associated with the first occasion, wherein a radio network temporary identifier associated with the control indication and a format of the downlink control information indicate that the at least one pre-scheduled communication in the first occasion is suspended; and
    performing one or more pre-scheduled communications with a user equipment (UE) during a second occasion of the set of occasions based at least in part on suspending the at least one pre-scheduled communication in the first occasion.

18. The method of claim 17, further comprising:
    identifying a number of frequency domain resource assignment bits to be included in the control indication, wherein the radio network temporary identifier comprises a cell radio network temporary identifier; and
    configuring the UE to skip the first occasion of the set of occasions based at least in part on the number of frequency domain resource assignment bits.

19. The method of claim 17, further comprising:
identifying a type associated with a resource allocation and a length of a resource block associated with the control indication; and
configuring the UE to skip the first occasion of the set of occasions based at least in part on the type associated with the resource allocation and the length of the resource block.

20. The method of claim 19, wherein a format associated with the control indication is 0_0 and the length of the resource block is zero.

21. The method of claim 17, further comprising:
identifying a resource allocation field value associated with the control indication; and
configuring the UE to skip the first occasion of the set of occasions based at least in part on the resource allocation field value.

22. The method of claim 21, wherein a format associated with the control indication is 5A and the resource allocation field value is zero.

23. The method of claim 17, further comprising:
identifying a format associated with the control indication and a bit included in the control indication; and
configuring the UE to skip the first occasion of the set of occasions based at least in part on the format associated with the control indication and the bit included in the control indication.

24. The method of claim 23, wherein the format associated with the control indication is 5A and the radio network temporary identifier comprises a sidelink control information suspension radio network temporary identifier.

25. The method of claim 23, wherein the format associated with the control indication is 0_0 and the radio network temporary identifier comprises a semi-persistent scheduling suspension radio network temporary identifier.

26. The method of claim 17, further comprising:
identifying a format associated with the control indication and a frequency domain resource assignment bit associated with the control indication; and
configuring the UE to skip the first occasion of the set of occasions based at least in part on the format associated with the control indication and the frequency domain resource assignment bit.

27. An apparatus for wireless communication at a user equipment (UE), comprising:
one or more memories storing code; and
one or more processors coupled with the one or more memories and individually or collectively operable to execute the code to cause the UE to:
receive a configuration for a set of occasions that include respective time and frequency resources configured for pre-scheduled communications;
receive, via downlink control information, a control indication associated with a first occasion of the set of occasions;
determine that at least one pre-scheduled communication in the first occasion of the set of occasions is suspended based at least in part on a radio network temporary identifier associated with the control indication and a format of the downlink control information; and
perform one or more pre-scheduled communications during a second occasion of the set of occasions based at least in part on suspending the at least one pre-scheduled communication in the first occasion.

28. The apparatus of claim 27, wherein the one or more processors are individually or collectively further operable to execute the code to cause the UE to:
identify a number of frequency domain resource assignment bits included in the control indication, wherein the radio network temporary identifier comprises a cell radio network temporary identifier; and
determine to skip the first occasion of the set of occasions based at least in part on identifying the number of frequency domain resource assignment bits.

29. An apparatus for wireless communication at a network entity, comprising:
one or more memories storing code; and
one or more processors coupled with the one or more memories and individually or collectively operable to execute the code to cause the network entity to:
transmit a configuration for a set of occasions that include respective time and frequency resources configured for pre-scheduled communications;
suspend at least one pre-scheduled communication in a first occasion of the set of occasions;
transmit, via downlink control information, a control indication associated with the first occasion, wherein a radio network temporary identifier associated with the control indication and a format of the downlink control information indicate that the at least one pre-scheduled communication in the first occasion is suspended; and
perform one or more pre-scheduled communications with a user equipment (UE) during a second occasion of the set of occasions based at least in part on suspending the at least one pre-scheduled communication in the first occasion.

30. The apparatus of claim 29, wherein the one or more processors are individually or collectively further operable to execute the code to cause the network entity to:
identify a number of frequency domain resource assignment bits to be included in the control indication, wherein the radio network temporary identifier comprises a cell radio network temporary identifier; and
configure the UE to skip the first occasion of the set of occasions based at least in part on the number of frequency domain resource assignment bits.

31. The method of claim 1, wherein the pre-scheduled communications comprise pre-scheduled sidelink communications.

32. The method of claim 17, wherein the pre-scheduled communications comprise pre-scheduled sidelink communications.

* * * * *